United States Patent Office 3,641,014
Patented Feb. 8, 1972

3,641,014
REDUCTION OF Δ³-CEPHALOSPORIN
SULFOXIDES
Charles F. Murphy, J. Alan Webber, Gary V. Kaiser, Earle M. Van Heyningen, Ian G. Wright, and Robin D. G. Cooper, Indianapolis, Ind., assignors to Eli Lilly and Company, Indianapolis, Ind.
No Drawing. Filed Oct. 3, 1968, Ser. No. 764,925
Int. Cl. C07d 99/24
U.S. Cl. 260—243 C                                13 Claims

ABSTRACT OF THE DISCLOSURE

Process for reducing cephalosporin sulfoxides with certain reducing agents in the presence or absence of acid halide activators to produce cephalosporins useful in an overall process for the manufacture of cephalosporin antibiotics, e.g., cephalothin, cephaloglycin, and the like, from penicillins.

---

This invention provides a new process for preparing Δ³-cephalosporanic acids and ester derivatives. More particularly, this invention provides certain chemical processes by which a Δ³-cephalosporanic acid or ester sulfoxide can be reduced to a corresponding Δ³-cephalosporanic acid or ester. The reduced cephalosporin products of the process of this invention are useful per se, as antibiotics, or as intermediates in a process for preparing new and known Δ³-cephalosporin antibiotic compounds. The term "cephalosporin" has been used generally to include 7-aminocephalosporanic acid (7–ACA) and other compounds including Cephalosporin C containing a fused Beta-lactam di- or tetra-hydrothiazine system. As used herein, the term "cephalosporin" alone refers to such a compound having the sulfur atom in the 1-position in the sulfide or bivalent state. The term "cephalosporin sulfoxide" is used herein to indicate that the sulfur atom in the 1-position of the molecule is bonded to a single oxygen atom.

BACKGROUND OF THE INVENTION

The semi-synthetic production of 7-acylamidodesacetoxy-cephalosporin antibiotics from penicillin starting materials has become of importance recently, due to the process invention of Morin and Jackson (U.S. Patent 3,275,626) who describe and claim a process for converting penicillin sulfoxide esters to desacetoxycephalosporanic acid esters and to the improvements on that Morin-Jackson process by Chauvette and Flynn (U.S. application Ser. No. 574,311, filed Aug. 23, 1966, now abandoned, but replaced by application Ser. No. 708,518, filed Feb. 27, 1968, now U.S. Patent No. 3,536,698, and application Ser. No. 711,904, filed Mar. 11, 1968, now U.S. Patent No. 3,536,705) who found that certain esters of the penicillin starting materials and of the resulting desacetoxycephalosporin ester products were more useful in the process in that they were more easily cleaved than those employed by Morin and Jackson. Further improvements of the Morin-Jackson process were claimed by Robin D. G. Cooper (U.S. applications Ser. No. 636,629, Ser. No. 636,593, and Ser. No. 636,592, all filed May 8, 1967 each of which has been abandoned but replaced by application Ser. No. 838,697, filed July 2, 1969, which combined the subject matter of those three applications) who found that the use of certain solvents directed the heat rearrangement of the penicillin sulfoxide esters more specifically toward production of the corresponding desacetoxycephalosporin esters and permitted the use of lower temperatures. Some of the 7-acylamidodesacetoxycephalosporanic acid compounds have been found to have unique properties as antibiotics in their own right. For example, cephalexin, 7-[D-alpha-aminophenylacetamido]-3-methyl-Δ³-cephem-4-carboxylic acid zwitterion and pharmaceutically acceptable cationic and anionic salt forms thereof are useful as oral antibiotics in combatting infections caused, e.g., by penicillin resistant strains of Staphylococcus aureus, and many other Gram-positive and Gram-negative microorganisms.

One of the unique advantages of Δ³-desacetoxycephalosporin compounds, that is, compounds of the general formula

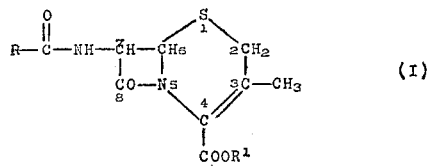

wherein R is the residue of the acylamido group in the 7-position, and R¹ is hydrogen, a salt forming cation, an ester group, or an anionic charge when the COO— forms a salt with a cation either within or outside of the molecule, is that such compounds can now be prepared from penicillin sulfoxide esters by the Morin-Jackson process, especially as improved by the Chauvette-Flynn and R. D. G. Cooper improvements.

Since the Morin-Jackson process discoveries and the Chauvette-Flynn and Cooper improvements thereon, J. Alan Webber and Earle M. Van Heyningen have discovered (U.S. application Ser. No. 703,523, filed Feb. 7, 1968, now abandoned and replaced by applications Ser. No. 790,886, filed Jan. 13, 1969, Ser. No. 790,842, filed Jan. 13, 1969, Ser. No. 802,641, filed Feb. 26, 1969, and Ser. No. 802,643, filed Feb. 26, 1969) that conversion of the Δ³-desacetoxycephalosporin esters to Δ²-isomers produces cephalosporin derivatives that can be converted to 3-bromomethyl-Δ²-desacetoxycephalosporin esters which are useful intermediates for the preparation of a wide variety of known and some new 3-(functionalized-methyl)cephalosporins either as the Δ²-isomer or as mixtures of Δ²- and Δ³-isomers. Following the Webber-Van Heyningen procedure, the products of that process are oxidized to the sulfoxide state to isomerize the double bond from the Δ² to the Δ³ position.

There is a claim in the literature (J. Chem. Soc. (C), 1966, No. 13, p. 1142) that the usual methods for reducing sulfoxides will not reduce Δ³-cephalosporin sulfoxides to the Δ³-cephalosporin sulfides. We have corroborated this observation. Thus, there is a need in the cephalosporin antibiotic art for processes which will permit the reduction of Δ³-cephalosporin sulfoxide compounds in good yields, and without any substantial destruction of the cephalosporin antibiotic activity due to chemical attack upon other functions of the cephalosporin molecule.

An object of this invention is to provide a process for reducing Δ³-cephalosporin sulfoxides to the corresponding Δ³-cephalosporin (sulfide) acid or ester compounds, thus permitting the semi-synthetic production of valuable known and new cephalosporin antibiotics.

A further object of this invention is to provide a process for reducing Δ³-cephalosporanic acids and ester sulfoxides with certain reducing agents in the presence of an additional activating agent.

Another object of this invention is to provide a process for reducing Δ³-cephalosporanic acid and ester sulfoxides to Δ³-cephalosporanic acids and esters (sulfides) with reducing agents which do not need external activators.

Other objects, aspects, and uses for this invention will become apparent from the detailed description of the invention which follows:

DETAILED DESCRIPTION OF THE INVENTION

According to the process of this invention, the cephalosporin sulfoxide, the reducing agent, and the activating agent (if needed) are mixed in a liquid medium at a temperature of from about −20° C. to about 100° C. until the reduced cephalosporin compound is obtained. A liquid medium is provided by the use of various common organic liquid diluents, or by use of an excess of the activating agent, if it is a liquid. When the selected reducing agent is one that does not require external activation, the reducing agent by itself or with an organic liquid diluent can be used to provide the liquid state for the reaction. Neither a special order of addition of the reactants nor the complete solubility of the reactants in the liquid medium is required. The reduction is allowed to proceed for a time sufficient for optimum conversion of the cephalosporin sulfoxide to the reduced cephalosporin. The method of isolation of the reduced cephalosporin product is dependent on the nature of the reagents used in the process. Customarily, the solvents or diluents are evaporated and the water soluble components of the crude reduction product are washed away from the product dissolved in an organic solvent immiscible with water. Evaporation of the organic solvent yields the $\Delta^3$-cephalosporanic acid sulfide or ester. If the starting $\Delta^3$-cephalosporanic acid sulfoxide has a suitable 7-acylamido group, the corresponding reduced 7-acylamidocephalosporanic acid product of the process of this invention may be formulated directly into known pharmaceutical compositions for use as an antibiotic. The 7-acylamido-$\Delta^3$-cephalosporin (sulfide) ester products of the process of this invention can be de-esterified, by known methods referred to above to form the active $\Delta^3$-cephalosporin antibiotic. For example, 2,2,2-trichloroethyl 3 - acetoxymethyl-7-phenoxyacetamido-$\Delta^3$-cephem-4-carboxylate, obtained from the corresponding sulfoxide by the reduction process of this invention may be de-esterified with zinc in formic acid to form the 3-acetoxymethyl - 7 - phenoxyacetamido-$\Delta^3$-cephem-4-carboxylic acid, a known antibiotic. Alternatively, if the $\Delta^3$-cephalosporin (sulfide) ester product contains a 7-acylamido group, it may be treated by known methods to remove the 7-acyl group, leaving the free 7-amino-$\Delta^3$-cephalosporanate (sulfide) ester nucleus, which nucleus can be acylated with an acylating form of a compound known to contribute to the antibiotic activity of the resulting $\Delta^3$-cephalosporanic acid derivative which can then be de-esterified, as described above, to obtain that antibiotically active $\Delta^3$-cephalosporanic acid compound. For example, p-methoxybenzyl 3-acetoxymethyl-7-phenoxyacetamido-$\Delta^3$-cephem-4-carboxylate-1-oxide, obtained by the Webber-Van Heyningen process referred to above from a desacetoxycephalosporin V ester is reduced by the process of this invention to p-methoxybenzyl 3-acetoxymethyl-7-phenoxyacetamido-$\Delta^3$-cephem-4-carboxylate, and then can be treated by known methods to remove the 7-phenoxyacetyl group to form the free p-methoxybenzyl 3 - acetoxymethyl-7-amino-$\Delta^3$-cephem-4-carboxylate (nucleus) which can be acylated with 2-(2'-thienyl)acetyl chloride and de-esterified to form cephalothin [3-acetoxy-7-[(2'-thienyl)acetamido]-$\Delta^3$-cephem-4-carboxylic acid] a widely known antibiotic, available commercially in the sodium salt form. This nucleus ester product can also be treated with an activated form of N-blocked-phenylglycin, such as the N-β-crotonyl mixed anhydride thereof, and the resulting intermediate can be de-blocked and de-esterified by known methods to form cephaloglycin, a known oral cephalosporin antibiotic.

According to one form or aspect of the process of this invention $\Delta^3$-cephalosporin sulfoxide (a) in acid or ester form, is treated or reacted with certain reducing agents (b) selected from the group consisting of: (1) hydrogen in the presence of known hydrogenation catalysts, such as the noble metal catalysts, e.g., platinum, palladium or rhodium on carbon or barium sulfate, or other equivalent carriers, or such noble metals in finely divided form without carrier; (a) stannous, ferrous, cuprous, or manganous cations, which can be supplied in the form of various commonly known inorganic and organic compound forms which have some solubility in the liquid medium used; (3) dithionate ($S_2O_4^=$), iodide, or ferrocyanide anions, which can also be supplied (in the form of inorganic or organic salt form); (4) trivalent phosphorus compounds having a molecular weight below about 500; (5) a halosilane compound of the formula

wherein X is chlorine, bromine, or iodine, and each of $R^1$ and $R^2$ is hydrogen, chlorine, bromine, iodine, or a hydrocarbon radical free from aliphatic unsaturation and having from 1 to 8 carbon atoms, or similar radicals known to those skilled in the art, and (6) a chloromethylene iminium chloride of the formula

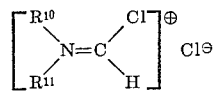

wherein each of $R^{10}$ and $R^{11}$ taken separately denotes a $C_1$ to $C_3$ alkyl, or taken together with the nitrogen to which they are bonded complete a monocyclic heterocyclic ring having from 5 to 6 ring forming atoms and a total of from 4 to 8 carbon atoms, in the presence of (c) an acid halide of an acid of carbon, sulfur, or phosphorus, which acid halide is inert to reduction by the reducing agent, and which acid halide has a second order hydrolysis constant equal to or greater than that of benzoyl chloride, in a substantially anhydrous liquid medium, at a temperature of from about −20° C. to about 100° C. to form a $\Delta^3$-cephalosporin acid or ester.

According to a second form or aspect of this invention, the reduction process of this invention may be conducted in the absence of the externally supplied acid halide activator (c). In this process the $\Delta^3$-cephalosporin sulfoxide (a) in acid or ester form is treated or reacted with a reducing agent (b) selected from the group consisting of (1) a trivalent phosphorus compound having at least one chlorine, bromine, or iodine bonded to the trivalent phosphorus atom, any remaining valences of the trivalent phosphorus atom being satisfied by a -hydrocarbon, -O-hydrocarbon, -S-hydrocarbon radical which is free of aliphatic unsaturation and has from 1 to 8 carbon atoms, or such -hydrocarbon, -O-hydrocarbon, and -S-hydrocarbon radicals substituted with chlorine or bromine; (2) a halosilane compound of the formula

wherein X is chlorine, bromine, or iodine, and each of $R^1$ and $R^2$ is hydrogen, chlorine, bromine, iodine, or a hydrocarbon radical free of aliphatic unsaturation having from 1 to 8 carbon atoms, and (3) a chloromethylene iminium chloride of the formula

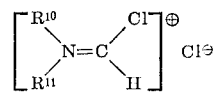

wherein each of $R^{10}$ and $R^{11}$ taken separately denotes a $C_1$ to $C_3$ alkyl, or taken together with the nitrogen to which they are bonded, complete a monocyclic heterocyclic ring having from 5 to 6 ring forming atoms and a total of from 4 to 8 carbon atoms; in a substantially anhydrous liquid medium under temperature conditions described above.

The Δ³-cephalosporin sulfoxide acid or ester starting materials may be described by the general formula

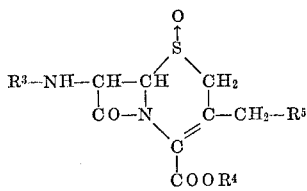

wherein R³ is hydrogen or an amino protecting group, R⁴ is hydrogen or an ester group, and R⁵ is hydrogen, or the residue of any nucleophilic group. The process has more practical economic applications where R⁵ is hydrogen or the group

—OR⁶ wherein R⁶ is a $C_1$ to $C_{12}$ hydrocarbon radical, such $C_1$ to $C_{12}$ hydrocarbon radicals substituted with a chemical group which has a nucleophilicity less than that of the oxygen bonded to R⁶, or

—C(O)—R⁷ wherein R⁷ is a $C_1$ to $C_{12}$ hydrocarbon radical, or such $C_1$ to $C_{12}$ hydrocarbon radicals substituted with a chemical group which has a nucelophilicity less than that of the —OC(O)— group to which R⁷ is bonded.

However, the process of this invention is applicable to a wide variety of cephalosporin sulfoxides so that any Δ²-cephalosporin or Δ³-cephalosporin, or mixtures of Δ²- and Δ³-cephalosporin that are oxidized to a cephalosporin sulfoxide can be reduced to the cephalosporin (sulfide). It is recognized that some portions of the groups R³, R⁴, and R⁵ in the above starting cephalosporin sulfoxide compounds may react in the course of the reduction with either the reducing agent (b) or some activating agent (c). It is practicable to choose a reducing agent for the sulfoxide that selectively reduces the sulfoxide in preference to other functions generally thought to be easily reduced. For example, 3-azidomethyl (R⁵ is $N_3$) or 3-cyanomethyl (R⁵ is —CN) groups in the cephalosporin sulfoxide starting material, which are reducible by catalytic hydrogenation are inert to alkali metal dithionite-acetyl chloride reduction of this invention. Similarly, nitro substituents, for example, on phenyl carbon atoms in the 7-acylamido group, R³, are reducible by stannous chloride acetyl chloride, but are inert to phosphorus trichloride reduction of the cephalosporin sulfoxide. However, it may be more practical to use excess reducing agent to reduce both sulfoxide and other reducible groups of the cephalosporin sulfoxides that contain reducible groups if the eventual cephalosporin sulfide products contain desirable substituents. In general, it is preferred to limit the reduction to the sulfoxide moiety of the cephalosporin sulfoxide starting material.

Many of the cephalosporin sulfoxide starting materials for the process of this invention are derived originally from penicillins. These cephalosporin sulfoxide materials thus often contain acyl functions (R³ in the above Formula I) that result from acids or acid halides or acid amides that were incorporated into the penicillin fermentation broth as precursors to the desired penicillins. Those cephalosporin sulfoxides which are derivatives of the penicillins described, for example, in Behrens et al. U.S. Patents 2,479,295 to 2,479,297 and 2,562,407 to 2,562,411 and 2,623,876 are particularly useful for making the cephalosporin sulfoxides used herein. Thus, R³ can be any acyl group appearing in a penicillin or cephalosporin compound derived by fermentation. R³ can also be any of the conventional amino protecting or blocking groups known in amino-acid chemistry. R³ can be an easily removable hydrocarbon group such as triphenylmethyl or a hydrocarbonoxycarbonyl group, e.g., a benzyloxycarbonyl or tert-butoxycarbonyl group, or a silyl group such as trimethylsilyl or triethylsilyl, but as is most practical, is preferably an acyl group. As indicated above, many such acyl groups suitable for use in the cephalosporin sulfoxide starting materials are already known in the penicillin and cephalosporin literature. Some such acyl groups may be subject to reduction by some of the reducing agents or chemical attack by some of the activating agents which may be used, in which case excess reducing agent would be needed to reduce the sulfoxide moiety of the starting Δ³-cephalosporin sulfoxide. For example, if p-nitrophenylacetyl or para-(methylsulfinyl)phenylacetyl are used as the acyl amino protecting group, the ring systems of these groups may be reduced by some reducing agents, but such conditions are not detrimental to the process, especially where the 7-acyl group will be cleaved later in the process to form the corresponding 7-aminocephalosporanic acid nucleus or 7-aminodesacetoxycephalosporanic acid nucleus, or cephalosporin $C_A$ nucleus or ester derivatives thereof. The process of this invention works equally well on cephalosporin sulfoxides in which the acyl protecting group is one that contributes to high antibiotic potency in 3-acetoxymethyl- or desacetoxycephalosporanic acids. Such acyl groups are represented by the formula

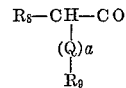

wherein R⁸ is phenyl, phenyl substituted with an electronegative substituent such as halogen, alpha-amino-($C_1$–$C_3$)-alkyl, nitro, trifluoromethyl and the like or R⁸ is a monocyclic heterocyclic ring such as 2-thiophene, 3-thiophene, 2-furyl, 3-furyl, and the like, Q is —NH—, —O—, or COO=, or —CO—R¹ where R¹ is —NH₂, —NHCH₃, or —N(CH₃)₂, and R⁹ is hydrogen, an amino protecting acyl group, such as furfuryloxycarbonyl, tert-butoxycarbonyl, p-methoxybenzyloxycarbonyl, and the like, $C_1$ to $C_6$ alkyl, or phenyl, tolyl, or xylyl. For example, a p-methoxybenzyl 3-acetoxymethyl-Δ³-cephalosporin sulfoxide ester containing as the amino protecting group, R³, an N-tert-butoxycarbonylamidophenylglycidyl group can be reduced by the process of this invention to a p-methoxybenzyl 3-acetoxymethyl-7-[(N-tert-butoxycarbonylamino) - phenylglycylamido]-Δ³-cephem-4-carboxylic acid (sulfide) ester. The ester group and the phenylglycine protecting group can be removed by known methods, e.g., with trifluoroacetic acid to form 3-acetoxymethyl-7-[D-α-aminophenylacetamido]-Δ³-cephem-4 - carboxylic acid, as the zwitterion (known generically as cephaloglycin) which is an antibiotic effective when administered by the oral route.

A group of Δ³-cephalosporin sulfoxide compounds which are preferred are those of the formula

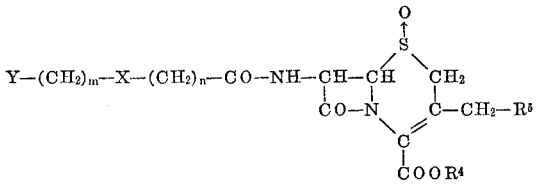

wherein $m$ is an integer of from 0 to 4, $n$ is an integer of from 1 to 4, X is oxygen or sulfur or a chemical bond, and Y is thienyl, phenyl, phenyl substituted with fluorine, chlorine, bromine, $C_1$ to $C_6$ alkyl, $C_1$ to $C_2$ alkoxy, nitro, cyano, N-protected alpha-amino —$C_1$ to $C_3$ alkyl, or trifluoromethyl, R⁴ is hydrogen, $C_1$ to $C_6$ alkyl, $C_3$–$C_6$ alkenyl, $C_3$–$C_6$ alkynyl, chloroalkyl having from 2 to 6 carbon atoms, benzyl, methoxybenzyl, benzhydryl, bis-(methoxyphenyl)methyl, phthalimidomethyl, succinimidomethyl, or phenacyl, and R⁵ is hydrogen, $C_2$ to $C_6$ alkanoyloxy, $C_1$ to $C_6$ alkoxy, or cyano.

A few representative examples of such preferred acyl (R³) groups include:

phenylacetyl
phenoxyacetyl
phenylethoxyacetyl phenylmercaptoacetyl
benzyloxyacetyl
phenylpropionyl
4-(1'-aminoethyl)phenylethoxyacetyl
phenylbutoxybutyryl
3-fluorophenoxyacetyl
4-bromophenylacetyl
2-chlorobenzyloxypropionyl
3-methylphenylbutyryl
4-propylbenzylmercaptoacetyl
4-nitrophenylethoxyacetyl
3-cyanophenylpropionyl
4-trifluorophenoxyacetyl, and the like.

The nature of $R^4$ (on the carboxyl group) in cephalosporin sulfoxide starting material is not critical to the success of the process. $R^4$ can be hydrogen, completing a carboxyl group, or an ester group. Preferred ester groups are those than can be removed during or after the reduction process. Such groups include the $C_1$ to $C_6$ alkyl, such as methyl, ethyl, propyl, but preferably the tert-butyl or tert-amyl, 2,2,2-trichloroethyl or 2,2,2-tribromoethyl, $C_3$ to $C_6$ alkenyl and $C_3$ to $C_6$ alkynyl such as the allyl, 3-butenyl, propenyl, 3-hexynyl and the like, benzyl, and the methoxy- and nitro-substituted benzyl esters such as p-methoxybenzyl, and p-nitrobenzyl, benzhydryl, bis(p-methoxyphenyl)methyl, trityl (triphenylmethyl), $C_1$-$C_3$ trialkylsilyl, e.g. trimethylsilyl, triethylsilyl, as well as the phenacyl ($C_6H_5C(O)$—$CH_2$—), halogenated phenacyl such as bromophenacyl, phthalimidomethyl, succinimidomethyl.

The nature of the group $R^5$ in the cephalosporin sulfoxide starting material and in the resulting cephalosporin (sulfide) product can vary extensively in accord with what is known in the cephalosporin antibiotic literature, particularly the patent literature, about the nature of the substituent $R^5$ position to obtain compounds of known antibiotic activity therefrom. Where $R_5$ is acetoxy, the cephalosporin sulfoxide and the cephalosporin (sulfide) product are generally termed "cephalosporanic acid" compounds, as in the fermentation derived cephalosporin C. When $R^5$ is hydrogen, the compounds are generally termed "desacetoxycephalosporins" indicating the absence of the acetoxy function, and the presence of a 3-methyl group in the cephalosporin compounds. Where $R^5$ is a group resulting from a nucelophilic reagent which has replaced bromine on a 3-bromomethyl-$\Delta^2$-cephalosporanate ester, in the manner described by Webber and Van Heyningen, referred to above, the compounds are referred to herein as 3 - (functionalized-methyl)-$\Delta^2$-cephalosporin ester compounds. These latter 3-(functionalized-methyl)-$\Delta^2$-cephalosporin esters, can also be reduced to the corresponding 3 - (functionalized-methyl)-$\Delta^3$-cephalosporanate (sulfide) esters by the process of this invention after conversion to the corresponding $\Delta^3$-cephalosporin sulfoxides. Many such 3 - (functionalized-methyl)cephalosporanic acid antibiotics derivatives are well known in the patent literature. They can be obtained by replacement of the acetoxy group of a cephalosporin C type compound, as that term is defined, for example, in U.S. Pat. 3,218,-318, or by replacement of the bromine in the 3-bromomethyl-$\Delta^2$-cephalosporin ester compounds described by Webber and Van Heyningen, referred to above. Examples of easily obtainable 3 - (functionalized-methyl)-$\Delta^3$-cephalosporin sulfoxide compounds for use in the process of this invention are those wherein $R^5$ is defined as being —$OR^6$ or —$OC(O)R^7$ above.

The nucleophilic reagents M—$OR^6$ which can be reacted with the 3-bromomethyl-$\Delta^2$-cephalosporin esters to form the 3-($R^6$—O—$CH_2$)-$\Delta^2$-cephalosporin esters may be exemplified generally by those wherein M is hydrogen, or a salt forming group such as alkali metal, e.g., sodium, potassium, ammonium, alkaline earth metal, including calcium, magnesium, and the like, and $R^6$ is hydrogen, $C_1$ to $C_{12}$ hydrocarbon preferably $C_1$ to $C_{12}$ alkyl, e.g., methyl, isopropyl, hexyl, dodecyl, $C_3$ to $C_6$ alkenyl, e.g., allyl, 3-butenyl, 3-hexenyl, phenyl, benzyl, phenylethyl, naphthyl, biphenylyl, and such phenyl, benzyl, phenylethyl, naphthyl, biphenyl substituted on ring carbon atoms thereof with $C_1$ to $C_6$ alkyl, fluorine, chlorine, bromine, methoxy, ethoxy, nitro, cyano, or trifluoromethyl; $C_5$ to $C_6$ cycloalkyl, and

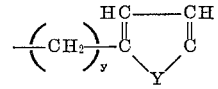

wherein Y is >NH, —O—, —S—, and y is 1 to 2. Examples of such compounds include water, alcohols such as methanol, isopropanol, hexanol, dodecanol, allyl alcohol, 3-butenyl alcohol, 3-hexenyl alcohol, phenol, benzyl alcohol, 2-phenylethanol, 3,5-dichlorobenzyl alcohol, 4-fluorophenol, 4-nitrophenylethanol, 4-cyanobenzyl alcohol, 3-trifluoromethylbenzyl alcohol, 4-chloro-$\alpha$-naphthyl alcohol, 3,3',5,5' - tetrachlorobiphenylyl alcohol, cyclopentanol, cyclohexanol, cycloheptanol, 2-pyrrolylmethanol, 3-pyrrolylpropanol, 2-thienylmethanol, thiophenol, 2-thienylethanol, 2-furylmethanol, and 3-furylmethanol.

The nucleophilic reagents M—$OC(O)R^7$ which can be reacted in a similar manner to form the 3-($R^7$—C(O)—O—$CH_2$)—$\Delta^2$— cephalosporin esters, are those wherein M is as defined above in M—$OR^6$, and $R^7$ is exemplified by $C_1$ to $C_{12}$ alkyl, $C_3$ to $C_6$ alkenyl, phenyl, benzyl, phenylethyl, and such phenyl, benzyl, and phenyl ethyl groups substituted on ring carbon atoms thereof with $C_1$ to $C_6$-alkyl, fluorine, chlorine, bromine, $C_1$ to $C_2$-alkoxy, trifluoromethyl, cyano, nitro, or $R^7$ is

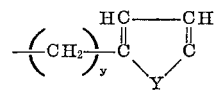

where Y is >NH, —O—, —S—, and y is 0 to 1. Such acids and salts are exemplified by formic, acetic, propionic, hexanoic, octanoic, dodecanoic, acrylic, methylacrylic, crotonic, 3-hexenoic, benzoic, phenylacetic, phenylpropionic, toluic, 3,5 - dimethylphenylacetic, 3,5-dichlorobenzoic, 4-bromophenylacetic, 4 - fluorophenylpropionic, 4-methoxyphenylacetic, 4-trifluorophenylacetic, 4-cyanobenzoic, 3-nitrobenzoic, thiophenecarboxylic, 3-thiophenecarboxylic, 2-furoic, 2-pyrrolylacetic acids and the like, and the alkali metal, e.g., the sodium or potassium, the alkaline earth metal, e.g., the calcium or magnesium or the ammonium salts of such acids, which are illustrated for example in U.S. Pat. 3,261,832.

A few specific examples of such 3 - (functionalized-methyl)-$\Delta^3$-cephalosporin sulfoxide starting materials include:

3-(ethoxymethyl)-7-phenoxyacetamide - $\Delta^3$ - cephem-4-carboxylic acid-1-oxide 4' - methoxybenzyl 3 - (phenoxymethyl)-7-phenylacetamido-$\Delta^3$-cephem-4-carboxylate-1-oxide Benzhydryl 3-(allyloxymethyl) - 7 - (3'-chlorophenylacetamido)-$\Delta^3$-cephem-4-carboxylate-1-oxide Trimethylsilyl 3 - (propionoyloxymethyl)-7-(trimethylsilylamino)-$\Delta^3$-cephem-4-carboxylate-1-oxide Phthalimidomethyl 3-(benzoyloxymethyl) - 7 - (thiophene-2-acetamido)-$\Delta^3$-cephem-4-carboxylate-1-oxide.

The reducing agents or reactant (b) used in the process of this invention may be divided into two classes: those requiring the presence of an external activating agent, and those which do not need an external activating agent. This latter class of reducing agent provides its own activation and does not need the presence of a third chemical activator reactant although the latter can be used therewith if desired. An activator as defined for this invention is a chemical molecule, ion, or moiety, which activates either the cephalosporin sulfoxide or the reducing agent for the overall reduction process. We believe that coordination of the activator moiety with the cephalosporin sulfoxide group is the actual mechanism for activation in most reductions, but we do not wish to be limited to this chemical mechanism theory in this invention, nor is it meant to limit the invention to the use of chemicals that act as activators by this mechanism and exclude activators that may operate by some as yet unknown mechanism.

The first class of reducing agents requiring external activation are listed below:

(1) Hydrogen: Hydrogen will reduce the cephalsporin sulfoxide by hydrogenolysis in the presence of a noble metal catalyst such as palladium, platinum, rhodium, either as the finely divided metal element, or as a compound thereof, or on some support such as carbon or barium sulfate, and the like.

(2) Stannous, ferrous, cuprous, or manganous cations: These cations were used in the form of inorganic or organic compounds or complexes which are at least partially soluble in the liquid medium and are exemplified by stannous chloride, stannous fluoride, stannous acetate, stannous formate, ferrous chloride, ferrous oxalate, ferrous succinate, cuprous chloride, cuprous benzoate, cuprous oxide, manganous chloride, manganous acetate, manganous oxide, and the like, as well as such cations provided in the form of complexes with known chelating agents such as ethylenediaminetetraacetic acid (EDTA), nitrilotriacetic acid, and the like;

(3) Dithionite, iodide, ferrocyanide anions: These anions can be used in the form of various inorganic or organic salts or complexes which provide the anion to the reaction medium. A few examples of useful compounds containing these anions are alkali metal, particularly the sodium and potassium salts of dithionite, iodide, or ferrocyanide, as well as hydroiodic acid, ferrocyanic acid, and the like.

(4) Trivalent phosphorus compounds having a molecular weight below about 500: These compounds can be inorganic or organic and include phosphines as well as phosphinite, phosphonite, and phosphite esters containing one, two, three, or mixtures of trivalent phosphorus-carbon, trivalent phosphorus-oxygen, or trivalent phosphorus-sulfur bonds, as well as inorganic trivalent phosphorus halides and amides, and trivalent phosphorus compounds containing one or two phosphorus-halogen bonds with the remaining trivalent phosphorus bonds being satisfied by organic radicals as defined above. In general, such compounds are the organic compounds of trivalent phosphorus and are the triaryl phosphites, trialkyl phosphites, mixed aryl alkyl phosphites, as well as the corresponding phosphonites, and phosphinite esters, and the triarylphosphines. In general, we prefer that such compounds have molecular weight below about 500 and are exemplified by triphenyl phosphite
tritolyl phosphite
trixylyl phosphite
tricresyl phosphite
trimethyl phosphite
triethyl phosphite
trihexyl phosphite
phenyl dimethyl phosphite
diphenyl ethyl phosphite
tolyl dihexyl phosphite
cresyl dimethyl phosphite
diphenyl phenylphosphonite
dicresyl cresylphosphonite
dimethyl methylphosphonite
dihexyl phenylphosphonite
methyl diphenylphosphinite
phenyl diethylphosphinite
xylyl dipropylphosphinite
cresyl dihexylphosphinites
triphenylphosphine
tritolylphosphine
trixylylphosphine
trimethylphosphine
tripropylphosphine and other trivalent phosphorus organic compounds with similar organic groups, as well as such compounds containing non-interfering substituents on carbon atoms of such compounds such as halogen, e.g., chlorine and bromine, such as tris(2-chloroethyl) phosphite
bis(2-chloroethyl) phenylphosphonite
2-chloroethyl dicresylphosphonite
tris(2-bromoethyl) phosphite and the trivalent phosphorus amide compounds N,N',N''-hexamethylphosphoramidite,
N,N',N''-hexaethylphosphoramidite, and
N,N',N''-tetramethyl(phenyl)phosphonodiamidite.

Other trivalent phosphorus compound reducing agents which may be used are those which contain at least one halogen such as chlorine or bromine, bonded directly to the trivalent phosphorus, e.g., phosphorus trichloride
phosphorus tribromide, and
phosphorus triiodide, as well as such trivalent phosphorus compounds having organic groups bonded to the trivalent phosphorus, as well as the halogen, e.g.

phenyl phosphorodichloridite
dimethyl phosphorobromidite
phenyl hexyl phosphorochloridite
tolylphosphonodibromidite
cresylphosphonochloridite
p-chlorophenylphosphonodichloridite
diethylphsophinobromidite
diphenylphosphinochloridite
dixylylphosphinobromidite, and the like.

In general, trivalent phosphorus compounds having halogen bonded to the phosphorus will reduce the cephalosporin sulfoxides without the external activator.

(5) Halosilanes: These compounds can be used with or without the presence of the external activating agent and are represented by the formula

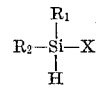

wherein X is chlorine, bromine, or iodine, each of $R_1$ and $R_2$ is selected from the group consisting of hydrogen, chlorine, bromine, iodine, or organic groups such that the average molecular weight of the halosilane is below about 500, but are preferably, hydrogen, $C_1$ to $C_6$ alkyl, phenyl, tolyl, or xylyl, and such compounds are exemplified by

| | |
|---|---|
| chlorosilane | silicon diiodide |
| bromosilane | diphenyl chlorosilane |
| iodosilane | dimethyl bromosilane |
| silicon trichloride | diethyl iodosilane |
| silicon tribromide | cresyl chlorosilane |
| silicon triiodide | hexyl chlorosilane |
| silicon dichloride | isopropyl dibromosilane |
| silicon dibromide | | and the like.

(6) Chloromethylene iminium chloride compounds: These reducing agents have the formula

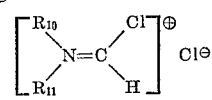

wherein each of $R_{10}$ and $R_{11}$ taken separately denote a $C_1$ to $C_3$-alkyl group, e.g., methyl, ethyl, propyl, isopropyl, or taken together with the nitrogen to which they are bonded complete a monocyclic heterocyclic ring having from 5 to 6 ring forming atoms and a total of from 4 to 8 carbon atoms. These chloromethylene iminium chloride reducing agents can be prepared in situ, that is, in the reaction mixture for the process of this invention by reacting an appropriate formamide with a chlorinating agent. For example, by adding dimethylformamide and an equimolar amount of a chlorinating agent such as oxalyl chloride, phosphorus oxychloride, thionyl chloride to the reaction mixture containing the $\Delta^3$-cephalosporin sulfoxide, there is formed chloromethylene N,N-dimethyl-iminium chloride, which reacts with the $\Delta^3$-cephalosporin sulfoxide to form the corresponding $\Delta^3$-cephalosporin. Other examples of chloromethylene amide chlorides which may be used include:

chloromethylene N,N-diethyliminium chloride
chloromethylene N-pyrrolidiniminium chloride
chloromethylene N-piperidiniminium chloride and the like.

The bromine analogs of such compounds also could be prepared and used in a similar manner from the respective brominating agents if desired. These halomethylene iminium halide reducing agents which are preferably prepared in situ, do not need the external activating agent (c).

The activating agent which may or may not be used in the process of this invention, depending upon the choice of reducing agent, is generally (c) an acid halide of an acid of carbon, sulfur, or phosphorus and is preferably inert to reduction by the reducing agent, to economize on reactants, and consequently should not contain reducible groups such as nitro or sulfoxide, or (d) a sultone compound of the formula

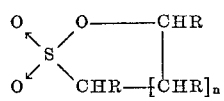

wherein $n$ is 0 or 1, and each R is defined separately as hydrogen, or $C_1$ to $C_3$ alkyl with not more than one such R being $C_1$ to $C_3$ alkyl. Whe have discovered that the acid halide (c) used in this reduction process should be one that has a second order hydrolysis constant value in 90 percent acetone and water solution at least as great as that of benzoyl chloride, as set forth by Beck and Ugi, Chem. Ber., 94, 1839 (1961). Some substituted acid halides, e.g., possess higher hydrolysis constants than benzoyl chloride, but are ineffective for activation, presumably because the substituent group, e.g., nitro, is reduced and the resulting acid chloride has an undesirably slow hydrolysis rate.

Examples of carbon acid halides which may be used as activators include phosgene, carbonyl dibromide, oxalyl chloride, $C_2$ to $C_{10}$ alkanoic acid halides, preferably the chlorides or bromides, e.g., acetyl chloride, acetyl bromide, propionyl chloride, butanoyl bromide, hexanoyl chloride, octanoyl bromide, decanoyl chloride. Useful sulfur acid halides are exemplified by thionyl chloride, thionyl bromide, methanesulfonyl chloride. Phosphorus acid halides are represented by phosphorus oxychloride, phosphorus oxybromide, as well as the halogenated trivalent phosphorus compounds mentioned under reducing agents, e.g., phosphorus trichloride, methyl phosphorodichloridite, and the like. Examples of sultones which can be used include propanesultone, 1,3-butanesultone, ethanesultone, 1,3-hexanesultone and the like.

In the practice of the process of this invention, many combinations of cephalosporin sulfoxides, reducing agents, and activators are possible. Not all combinations are equally effective, so that for a given reducing agent one or more activating agents will give optimum reductions of cephalosporin sulfoxides. In general, however, the most active activating agents are the chemically simplest ones, and are most generally applicable.

The cephalosporin sulfoxide is generally combined with at least a reducing equivalent of the reducing agent, and an equivalent amount of the activating agent if the selected reducing agent is one that needs external activation. As a practical matter, at least a slight excess of reducing agent and activating agent are used, relative to the cephalosporin sulfoxide on a reducing equivalent basis to insure complete reduction thereof, because the sulfoxide is usually the most expensive of the three reactants. The liquid medium may be provided by any substantially anhydrous organic liquid which is inert to the reduction reaction, or can be provided by an excess of any liquid activating agent that is used, e.g., acetyl chloride, without detriment to the reactants or cephalosporin sulfide product. Although anhydrous conditions are preferred, the presence of a small amount of water in the mixture, under 5 percent, is not seriously detrimental to the reaction.

The reduction process of this invention may be conducted in a wide variety of organic solvents or diluents. Solvents suitable for hydrogenolysis in the presence of the nobel metal catalysts such as platinum, palladium, or rhodium are those that dissolve both the cephalosporin sulfoxide, and the activator, that do not poison the catalyst, and are themselves inert to hdrogenation. Examples of such solvents are alkanoic acids, esters thereof, or the activating acid halide thereof, e.g., acetic acid, propionic acid, mixed pentanoic acids, ethyl acetate, amyl acetate, propionyl bromide, and the like. For the other types of reductions of this process, it is preferred to use a solvent that will at least partially dissolve the cephalosporin sulfoxide, reducing agent, and external activator, if used. For these reductions, the preferred solvents are inert to the action of reducing and activating agents. Since the best activators are acid halides, solvents containing hydroxyl, amino groups having hydrogen bonded to the amino groups, or free mercapto groups should not be used. Similarly, solvents containing readily reducible groups such as nitro and sulfoxide groups which may consume some of the reducing agent are not preferred because they are wasteful of reducing agents, although such solvents are not precluded if the cephalosporin sulfoxide reduction proceeds at a sufficiently greater rate than solvent reduction. Useful solvents or diluents for this purpose include the common hydrocarbon solvents such as benzene, toluene, xylene, heptane, esters such as ethyl acetate, amyl acetate, ethers such as ethyl ether and tetrahydrofuran, ketones such as acetone, methyl ethyl ketone, alkanenitriles such as acetonitrile, propionitrile, sulfones such as dimethylsulfone, diphenylsulfone, and tetramethylene sulfone (sulfolane), halogenated hydrocarbons such as dichloroethane, dichloromethane, chloroform, carbon tetrachloride, tertiary amides of carboxylic, phosphoric, phosphonic, phosphinic acids, and sulfonic acids which are liquid at the desired temperature of reduction, e.g., dimethylformamide, dimethylacetamide, diethylformamide, hexamethylphosphoramide, tetramethyl (dimethyl)phosphonamide, dimethyl(tetramethyl)-phosphinamide, N,N - dimethyl(methane)sulfonamide, N,N-diethyl(phenyl)sulfonamide, and the like. Some nitroparaffins are useful as solvents with certain reducing agents, e.g., nitromethane, nitroethane, and nitropropane. Of course, mixtures of solvents which provide ready dissolution of reactants and dissipation of heat of reaction are also contemplated for use in the process of this invention. If the activating agent used is a liquid, it can also serve as the solvent for the reactants if used in excess.

The temperature at which the reduction is conducted is a function of several factors. In general, the reduction can be conducted at temperatures of from about $-20°$ C. to about 100° C. However, most active activators coupled with the most active reducing reagents permit reduction at relatively low temperatures (below room temperatures) in short periods of time. If the selected reducing agent is less active, or if the reducing agent and activator combination used therewith is relatively slow reacting at low temperature, the temperature is raised to permit the reduction to proceed at a rate consistent with economics and optimum yield.

The $\Delta^3$-cephalosporin sulfide ester products can be used to make known cephalosporin antibiotics such as cephalothin, cephaloridine, cephaloglycin, cephalexin and the like by acylating the 7–ACA or 7–ADCA nucleus acid or ester with the appropriate acyl group by known methods. Ester groups can be removed by known ester group removal methods. The resulting $\Delta^3$-cephalosporin acid derivatives are known to be active as antibiotics against a variety of Gram-positive and Gram-negative disease causing microorganisms when administered parenterally (cephalothin, cephaloridine) or orally (cephaloglycin, cephalexin) in appropriate pharmaceutical formulations in daily doses ranging from 0.5 to about 6 grams of the antibiotic per day depending upon the body weight of the patient.

Specific starting materials, intermediates, and products of the process of this invention are named, for convenience, by use of the "cephem" nomenclature system which has been adapted to cephalosporin compounds from an analogous nomenclature system, based on "penam" for naming specific penicillin compounds. "Penam" nomenclature for the penicillins is described by Sheehan, Henery-Logan, Johnson in the Journal of American Chemical Society (JACS), 75, 3292, footnote 2 (1953), and has been adapted to the cephalosporins by Morin et al. in JACS, 84, 3400 (1962). In accordance with these systems of nomenclature, "Penam" and "cepham" refer respectively to the following saturated ring systems.

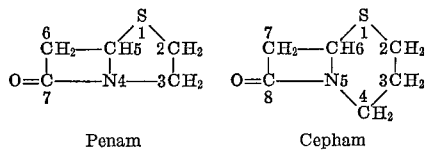

Penam            Cepham

"Cephem" refers to the cepham ring structure containing a double bond, the position of which is indicated by the prefix "Δ" with an integer superscript denoting the lowest numbered carbon atom to which the double bond is connected, or by the word "delta" with the same number relationship. Occasionally, a number immediately preceeding the word "cephem" is used by itself to indicate the position of the double bond in the "cephem" structure. Thus, for example, a $\Delta^3$-desacetoxycephalosporanate sulfoxide ester, derived from penicillin V, and used in the process of this invention, is named 2,2,2-trichloroethyl 3 - methyl - 7 - phenoxyacetamido - $\Delta^3$ - cephem - 4-carboxylate-1-oxide, and the product obtained therefrom upon reduction is named 2,2,2-trichloroethyl 3-methyl-7-phenoxyacetamido-$\Delta^3$-cephem-4-carboxylate.

The invention is further illustrated by the following detailed examples:

Example 1

2,2,2-trichloroethyl 3-methyl - 7 - phenylacetamido-$\Delta^3$-cephem-4-carboxylate-1-oxide (500 mg., 1.05 mmoles) was dissolved in 8 ml. of acetonitrile. Sodium dithionite (500 mg., 2.9 mmoles) was added. The resulting suspension was stirred at 0° and acetyl chloride (550 mg., 7.0 mmoles) was added. The mixture was stirred in the cold for 45 minutes and then poured into a separatory funnel containing 50 ml. of 5 percent aqueous sodium bicarbonate. The organic material was extracted into 50 ml. of ethyl acetate which was, in turn, washed with distilled water and dried over anhydrous magnesium sulfate. Removal of the solvent in vacuo yielded 410 mg. (85 percent) of 2,2,2-trichloroethyl 3-methyl-7-phenylacetamido-$\Delta^3$-cephem-4-carboxylate as shown by its NMR, UV, and IR spectra and its thin layer chromatogram (silica gel plates, using 2:1 benzene:ethyl acetate solvent).

Example 2

Phosphorous trichloride (3.2 g., 22 mmoles) was added to a stirred solution of 2,2,2-trichloroethyl 3-methyl-7-phenoxy acetamido-$\Delta^3$-cephem-4-carboxylate-1-oxide (2.00 g., 4.06 mmoles) in 100 ml. of methylene chloride. The solution was heated under reflux for 2½ hours. After cooling to room temperature, the reaction solution was neutralized with a saturated solution of aqueous sodium bicarbonate, washed with distilled water, and dried over anhydrous magnesium sulfate. Removal of the solvent in vacuo yielded 1.50 g. (77 percent) of reduced material. The NMR, IR, and UV spectra and thin layer chromatographic analysis (silica gel plates with 1:1 benzene ethyl acetate) of the product showed that it was identical to a known sample of 2,2,2-trichloroethyl 3-methyl-7-phenoxyacetamido-$\Delta^3$-cephem-4-carboxylate.

Similarly 2,2,2-trichloroethyl 3-methyl-7-phenylacetamido-$\Delta^3$-cephem-4-carboxylate-1-oxide (1.00 g., 2.09 mmoles) was reduced with phosphorous trichloride (1.6 g., 11 mmoles) to yield 760 mg. (79 percent) of 2,2,2-trichloroethyl 3-methyl-7-phenylacetamido - $\Delta^3$ - cephem-4-carboxylate.

Example 3

3 - methyl - 7 - phenoxyacetamido - $\Delta^3$ - cephem - 4-carboxylic acid-1-oxide (200 mg., 0.42 mmole) was dissolved in 2 ml. of N,N-dimethylformamaide (DMF). Sodium dithionite (200 mg., 1.15 mmoles) was added. The resulting suspension was stirred while cooled at 0°, and acetyl chloride (225 mg., 3.5 mmoles) was added. The cooled suspension was stirred for 45 minutes. It was then poured into a separatory funnel containing 50 ml. of water. The organic material was extracted into 50 ml.of ethyl acetate. The ethyl acetate solution was washed with 50 ml. of water and dried over magnesium sulfate. Removal of the solvent in vacuo yielded 190 mg. of crude 3 - methyl - 7 - phenoxyacetamido - $\Delta^3$ - cephem - 4 - carboxylic acid.

Example 4

2,2,2-trichloroethyl 3 - methyl-7-phenoxyacetamido-$\Delta^3$-cephem-4-carboxylate-1-oxide (500 m., 1.01 mmoles) was dissolved in 20 ml. of methylene chloride. The solution was stirred at room temperature, and trichlorosilane (1.00 ml., 1.35 g., 10.0 mmoles) was added. The solution was stirred at room temperature for two hours and then poured into a beaker containing 50 ml. of water. The resulting inorganic precipitate was filtered, washed thoroughly with methylene chloride, and discarded. The filtrate was poured into a separatory funnel where the aqueous and organic layers were separated. The organic phase was washed with 50 ml. of distilled water and dried over anhydrous magnesium sulfate. Removal of the solvent in vacuo yielded 340 mg. (70 percent) of reduced material whose NMR and IR spectra and thin layer chrotmatogram (2:1 benzene:ethyl acetate, silica gel plates) was identical to those of a known sample of 2,2,2-trichloroethyl 3 - methyl - 7 - phenoxyacetamido - $\Delta^3$-cephem-4-carboxylate.

Example 5

2,2,2 - trichloroethyl 3 - methyl - 7 - phenoxyacetamido-$\Delta^3$-cephem-4-carboxylate-1-oxide (500 mg., 1.01 mmole) was dissolved in glacial acetic acid (20 ml.) and solid sodium iodide (3 gm.) and sodium thiosulfate (1 gm.) added. Approximately 0.5 ml. acetyl chloride was added with vigorous stirring. After about 5 minutes when the color had faded from dark brown to lemon yellow, a further 0.5 ml. acetyl chloride was added. After 10 minutes more stirring, the reaction mixture was poured slowly into 5 percent sodium bicarbonate aqueous solution and solid sodium bicarbonate was added to bring the pH of the mixture to 7. The product was extracted with ethyl acetate, yielding 560 mg. crude material which was chromatographed on Woelm Activity I silica gel (30 gm.) using a linear gradient, benzene to ethyl acetate (31.). Analysis of the fractions by thin layer chromatography revealed the presence of the desired reduction product, 2,2,2 - trichloroethyl 3-methyl - 7 - phenoxyacetamido-$\Delta^3$-cephem-4-carboxylate, as well as unreacted sulfoxide. Combination of appropriate fractions yielded 170 mg. trichloroethyl 3-methyl-7-phenoxyacetamido-$\Delta^3$-cephem-4-carboxylate and 290 mg. of recovered sulfoxide. This corresponds to a 35 percent yield, based on starting material used, or an 83 percent yield, based on unrecovered starting materials. The product was identified by comparison with a known sample by thin layer chromatography, and by comparison of IR and NMR spectra.

Example 6

2,2,2-trichloroethyl 3 - methyl - 7 - phenoxyacetamido-$\Delta^3$-cephem-4-carboxylate-1-oxide (1.1 gm., 2.22 mmoles) was dissolved in glacial acetic acid (90 ml.) and sodium dithionite ($Na_2S_2O_4$) (6.6 gm.) was added. Acetyl chloride (17 ml.) was added with stirring over a few minutes and the reaction mixture was stirred at 25° C. for 2 hours. The solvent was then evaporated in vacuo and the residue was shaken between water and methylene chloride. The crude product was chromatographed on silica gel, yielding approximately 600 mg. 2,2,2-trichloroethyl 3-methyl-7-phenoxyacetamido-$\Delta^3$-cephem - 4 - carboxylate, identified as in Example 5.

Example 7

2,2,2 - trichloroethyl 3-methyl - 7 - phenoxyacetamido-$\Delta^3$ - cephem - 4 - carboxylate - 1 - oxide (2.0 gm., 4.02 mmoles), and sodium dithionite (2.0 gm., 11.5 mmoles) were suspended in dimethyl formamide (5 ml.) in an ice bath. Acetyl chloride (10 ml.) was added slowly, with stirring and the mixture was stirred in the cold for 30 minutes, poured into saturated aqueous sodium bicarbonate solut ion and extracted with ethyl acetate. The crude product from the organic layer was chromatographed on silica ge l, yielding approximately 1.6 gm. (82 percent) 2.2,2-trichloroethyl 3-methyl-7-phenoxyacetamido-$\Delta^3$-cephem-4-carboxylate.

Example 8

To a solution of 500 mg. of p-methoxybenzyl ceph V sulfoxide ester [p-methoxybenzyl 3-acetoxymethyl-7-phenoxyacetamido-$\Delta^3$-cephem - 4 - carboxylate-1-oxide] in 40 ml. of DMF was added 10 cc. of acetyl chloride and then 3 gm. of sodium dithionite. An exothermic reaction ensued. When the exothermic reaction subsided, the mixture was stirred at room temperature for 4 hours to ensure complete reaction. The mixture was cooled, diluted with benzene, and quenched with aqueous sodium bicarbonate solution. After the vigorous gas evolution subsided, more benzene was added, the organic layer was washed well with aqueous sodium bicarbonate solution, then with aqueous sodium chloride solution, and then dried over magnesium sulfate. The organic layer was filtered from the magnesium sulfate drying agent, and evaporated to give 635 mg. of a brown oil. This crude brown oil product was purified on a column of silica gel containing 15 percent water. There was obtained 253 mg. of an oily product whose nuclear magnetic resonance (NMR), infrared (I.R. and ultraviolet (UV) spectra were the same as those of a known sample of p-methoxybenzyl 3-acetoxymethyl - 7 - phenoxyacetamido-$\Delta^3$-cephem-4-carboxylate. This oil was crystallized from ethyl ether to give 195 mg. of the pure ester, M.P. 118–119° C., which gave no melting point depression upon mixture with known p-methoxybenzyl 3-acetoxymethyl-7-phenoxyacetamido - $\Delta^3$ - cephem-4-carboxylate ester.

Example 9

To a solution of 1.028 g. (0.002 mole) of p-methoxybenzyl 3 - methoxymethyl - 7 - phenoxyacetamido-$\Delta^3$-cephem-4-carboxylate-1-oxide in 75 cc. of dry DMF, there was added 15 cc. of acetyl chloride and then 6 g. of sodium dithionite ($Na_2S_2O_4$). The ensuing reaction was exothermic. When the exothermic reaction subsided, the mixture was stirred for 4 hours at room temperature, cooled, and then diluted with benzene and treated with aqueous sodium bicarbonate solution. When decomposition of the acetyl chloride was complete, water was added and the mixture was extracted twice with benzene. The combined benzene extracts were washed well with aqueous sodium bicarbonate solution and aqueous sodium chloride solution, and then dried over anhydrous magnesium sulfate, filtered, and then evaporated to give 1.32 g. of p-methoxybenzyl 3-methoxymethyl-7-phenoxyacetamido-$\Delta^3$-cephem-4-carboxylate as a dark brown semi-solid crude product.

This crude product was purified by column chromatography and eluted from a silica gel-15 percent water column with benzene-5 percent ethyl acetate. There was obtained 300 mg. of p-methoxybenzyl 3-methoxymethyl-7-phenoxyacetamido-$\Delta^3$-cephem-4-carboxylate, M.P. 116–117.5, after crystallization from ethyl ether. The assigned structure was verified by NMR and elemental analysis.

In a similar manner tert-butyl 3-methoxymethyl-7-phenoxyacetamido-$\Delta^3$-cephem-4-carboxylate is obtained from tert-butyl 3-methoxymethyl-7-phenoxyacetamido-$\Delta^3$-cephem-4-carboxylate-1-oxide.

Example 10

This example illustrates the reduction process conducted with various inorganic reducing ions.

Cuprous ion.—A solution of 0.2 g. (0.4 millimole) of 2,2,2-trichloroethyl 3-methyl-7-phenoxyacetamido-$\Delta^3$-cephem-4-carboxylate-1-oxide (sulfoxide) in 10 ml. of acetonitrile was stirred with 0.07 g. (0.5 millimole) of cuprous oxide and 0.3 ml. of acetyl chloride for 15 minutes at 25° C. The solution was then poured into water and extracted with benzene. The benzene solution was washed with five percent sodium bicarbonate solution, and then with water, and dried over anhydrous sodium bicarbonate solution, and then with water, and dried over anhydrous sodium sulfate, and evaporated to dryness under reduced pressure. The crude 2,2,2-trichloroethyl 3 - methyl-7-phenoxyacetamido-$\Delta^3$-cephem-4-carboxylate (sulfide) product, 0.192 g., crystallized from ethyl ether as prism crystals, M.P. 118–120° C. as compared with the melting point of 117–119° C. of a known sample of the same product. The nuclear magnetic resonance spectrum (NMR) showed the material to be essentially pure sulfide.

Stannous ion.—A solution of 0.2 g. of 2,2,2-trichloroethyl 3 - methyl-7-phenoxyacetamido-$\Delta^3$-cephem-4-carboxylate-1-oxide was treated with 0.2 g. of stannous chloride and 0.3 ml. of acetyl chloride in 5 ml. of acetonitrile and 2 ml. of dimethylformamide. This mixture was stirred for 60 minutes at 25° C. 2,2,2-trichloroethyl 3-methyl-7-phenoxyacetamido-$\Delta^3$-cephem-4-carboxylate was isolated (0.187 g.) as above as prismatic crystals, M.P. 113–115° C. The NMR spectrum was consistent with the sulfide structure.

Ferrous ion.—A solution of 0.2 g. (0.04 millimole) of 2,2,2-trichloroethyl 3-methyl-7-phenoxyacetamido-$\Delta^3$-cephem-4-carboxylate-1-oxide (sulfoxide) in 5 ml. of acetonitrile and 3 ml. of dimethylformamide was stirred for 1 hour with 0.8 ml. of acetyl chloride and 0.30 g. of ferrous sulfate·$7H_2O$. The 2,2,2-trichloroethyl 3-methyl-7-phenoxyacetamido-$\Delta^3$-cephem - 4 - carboxylate (sulfide) product, 0.183 g., was isolated as above as prismatic crystals, M.P. 112–115° C. The NMR spectrum showed the product to be nearly pure sulfide.

Iodide ion.—A solution of 0.2 g. of the 2,2,2-trichloroethyl 3-methyl - 7 - phenoxyacetamido-$\Delta^3$-cephem-4-carboxylate-1-oxide (sulfoxide) in 10 ml. of acetonitrile containing 0.2 g. of potassium iodide and 0.3 ml. of acetyl chloride was stirred at 25° C. for 105 minutes. The 2,2,2-trichloroethyl 3 - methyl-7-phenoxyacetamido-$\Delta^3$-cephem-4-carboxylate (sulfide) product was isolated as described above to give 0.182 g. of prismatic crystals, M.P. 118–

120° C. The NMR spectrum showed the product to be essentially pure sulfide.

Manganese ion, in the form of manganous sulfate, in combination with an activating agent, also reduced this same sulfoxide to the sulfide corresponding ester. The following compounds containing inorganic reducing cations or anions gave an indication of reduction but also gave a mixed reaction product or some decomposition, and thus are not preferred for practical economical operation of the process.

| Cationic compounds | Anionic compounds |
| --- | --- |
| $Bi_2O_3$ | $NaHSO_3$ |
| $As_2O_3$ | $Na_2S_2O_3$ |
| $Hg_2Cl_2$ | $K_4Fe(CN)_6$ |
| $CrCl_2$ | $H_2S$ |
| $SeO_2$ | $NaNO_2$ |
| $NiCl_2 \cdot 6H_2O$ | $KI/CH_3COOH$ |
| $Pb(NO_3)_2$ | $Na_2S_2O_5$ |
| | $NaHS \cdot H_2O$ |

Example 11

To a solution of 380 mg. of p-methoxybenzyl 3-cyanomethyl - 7-phenoxyacetamido-$\Delta^3$-cephem-4-carboxylate-1-oxide [prepared as described in U.S. application Ser. No. 703,523, filed Feb. 7, 1968] in 20 cc. of DMF, cooled in an ice-bath, there was added 1.5 gm. of sodium dithionite, and then 4 cc. of acetyl chloride. The mixture was stirred in the cold for 1 hour, and then poured into a mixture of benzene and aqueous sodium bicarbonate solution. After the excess acetyl chloride had decomposed, the benzene layer was removed, treated twice with aqueous sodium chloride solution, dried over anhydrous magnesium sulfate, filtered, and evaporated to give 580 mg. of crude p-methoxybenzyl 3 - cyanomethyl - 7-phenoxyacetamido-3-cephem-4-carboxylate product. This crude product was chromatographed on a column of silica gel-15 percent water. Substantially pure p-methoxybenzyl 3-cyanomethyl-7-phenoxyacetamido-$\Delta^3$-cephem-4-carboxylate, about 300 mg., was eluted with benzene-4 percent ethyl acetate mixture, and crystallized from ether, M.P. 145–147° C. The structure of this product was confirmed by a spectral methods and elemental analysis.

The analogous tert-butyl 3-cyanomethyl-7-phenoxyacetamido - 3- cephem-4-carbxoylate-1-oxide undergoes the same reduction conversion to the tert-butyl 3-cyanomethyl - 7-phenoxyacetamido-3-cephem-4-carboxylate by this reduction process.

Example 12

To a cooled solution of 50 mg. of p-methoxybenzyl 3-methyl 7 - phenoxyacetamido-$\Delta^3$-cephem-4-carboxylate-1-oxide in 5 cc. of nitromethane there was added 100 mg. of sodium dithionite, and 1 cc. of acetyl chloride. The mixture was cooled at ice-bath temperature and stirred for one hour. Fifty milliliters of benzene was added to the resulting reaction mixture, followed by aqueous sodium bicarbonate solution. After stirring until excess acetyl chloride had been decomposed, the benzene layer was separated from the aqueous layer. The benzene layer was washed with saturated aqueous sodium chloride solution, dried over magnesium sulfate, filtered, and evaporated to give 28 mg. of a crude oily product which was shown by thin layer chromatography comparison with a known sample to be p-methoxybenzyl 3-methyl-7-phenoxyacetamido-$\Delta^3$-cephem-4-carboxylate.

In the same manner, this reduction process can be carried out, using solvents such as dimethylformamide, hexamethylphosphoramide, N-methylpyrrolidone, or sulfolane at cool temperatures of from about −20 to +5° C. If higher reaction temperatures are desired, solvents such as acetone, tetrahydrofuran, dioxane, 1,2-dichlorethane can be used.

Example 13

A 500 mg. (1.01 milimoles) sample of 2,2,2-trichloroethyl 3 - methyl-7-phenoxyacetamido-$\Delta^3$-cephem-4-carbox-ylate-1-oxide was dissolved in 20 ml. of methylene chloride. To the resulting solution 1.0 ml. (1.32 g., 7.4 millimoles) of phenylphosphonodichloridite was added, and the mixture was stirred at room temperature for four days. The resulting mixture was then neutralized with aqueous sodium bicarbonate solution, washed with distilled water, and dried over anhydrous magnesium sulfate. Removal of the solvent in vacuo yielded a brown oil.

The oil was passed through a chromatographic column (15 g. of 15 percent water/silica gel, 16 mm. in diameter) using benzene as eluent. The fractions containing a single component, as determined by thin layer chromatography, were combined to give 95 mg. (18 percent yield) of product. Infrared and nuclear magnetic resonance spectra showed the material to be 2,2,2-trichloroethyl 3-methyl-7-phenoxyacetamido-$\Delta^3$-cephem-4-carboxylate.

Example 14

To a solution of 100 mg. of 2,2,2-trichloroethyl 3-methyl - 7-phenoxyacetamido-$\Delta^3$-cephem-4-carboxylate-1-oxide in 30 ml. of benzene was added 0.2 ml. of trimethyl phosphite followed by 1 ml. of acetyl chloride. The solution was stirred at room temperature for 3 hours, washed with a saturated solution of sodium bicarbonate in water, and then with two 100 ml.-portions of water. The solution was dried over magnesium sulfate. The solvent was removed in vacuo to give the cephalosporin sulfide as a solid residue, which by thin layer chromatographic analysis was identical to a known sample of 2,2,2-trichloroethyl 3 - methyl - 7-phenoxyacetamido-$\Delta^3$-cephem-4-carboxylate.

Example 15

To a solution of 100 mg. of 2,2,2-trichloroethyl 3-methyl 7 - phenoxyacetamido-$\Delta^3$-cephem-4-carboxylate-1-oxide in 10 ml. of dimethylformamide was added 100 mg. of triphenylphosphine followed by 0.5 ml. of acetyl chloride. The mixture was stirred for three hours at room temperature, then poured into 100 ml. of water, and extracted with two 50 ml. portions of ethyl acetate.

The combined ethyl acetate fratcions were washed with saturated sodium bicarbonate soltuion, and then with two 100 ml. portions of water. The ethyl acetate fraction was dried over magnesium sulfate, and the solvent was removed in vacuo. Thin layer chromatographic analysis showed the product to be 2,2,2-trichloroethyl 3-methyl-7-phenoxyacetamido-$\Delta^3$-cephem-4-carboxylate.

Example 16

To a solution of 100 mg. of 2,2,2-trichloroethyl 3-methyl 7 - phenoxyacetamido-$\Delta^3$-cephem-4-carboxylate-1-oxide and 250 mg. of triphenylphosphine in 5 ml. of dimethylformamide, there was added 5 ml. of methanesulfonyl chloride. The mixture was stirred at room temperature for 48 hours. The resulting reaction mixture was added to 50 ml. of ethyl acetate and washed with saturated sodium bicarbonate solution and then with water. The organic solvent layer was separated and dried over magnesium sulfate. The organic solvent was removed in vacuo. Thin layer chromatographic analysis showed the product to be 2,2,2-trichloroethyl 3-methyl-7-phenoxyacetamido-$\Delta^3$-cephem-4-carboxylate.

This same reduction was successfully conducted in benzene, dioxane, and acetonitrile.

The 2,2,2-trichloroethyl 3-methyl-7-phenoxyacetamido-$\Delta^3$-sephem-4-carboxylate product from each of the above reduction reactions was treated with 1 gm. zinc dust in 25 ml. of tetrahydrofuran containing 1 ml. of 90 percent acetic acid in water solution, and stirred for two hours. The solution was then filtered and the solid was washed with 100 ml. of ethyl acetate. To the mixture of the ethyl acetate and aqueous solution was added 1 ml. of 1 N hydrochloric acid, and after shaking, the ethyl acetate solution was separated. Extraction of the ethyl acetate solution with saturated sodium bicarbonate solution, acidification of the aqueous solution to pH 3 with 1 N hydrochloric acid, and extraction of the acid solution with ethyl aceate, gave after drying with magnesium sulfate, and removal of the solvent under vacuum, the acid product, 3-methyl-7-phenoxyacetamido-$\Delta^3$-cephem - 4 - carboxylic acid, a known antibiotic, which antibiotic activity was confirmed in each case by bioautogram procedures.

Example 17

The following table summarizes a series of runs in which attempts were made to reduce cephalosporin sulfoxides.

For convenience, the abbreviations are defined as follows:

Sulfoxides:

TCE-DCV=2,2,2-trichloroethyl 3-methyl-7-phenoxyacetamido-$\Delta^3$-cephem-4-carboxylate-1-oxide
PMB-DCV=p - methoxybenzyl 3-methyl-7-phenoxyacetamido-$\Delta^3$-cephem-4-carboxylate-1-oxide
TCE-Ceph V=2,2,2-trichloroethyl 3-acetoxy-7-phenoxyacetamido-$\Delta^3$-sephem-4-carboxylate-1-oxide
t-butyl-DCV=tert - butyl 3-methyl-7-phenoxyacetamido-$\Delta^3$-cephem-4-carboxylate-1-oxide
DCV=3-methyl-7-phenoxyacetamido-$\Delta^3$-cephem-4 - carboxylic acid-1-oxide
TCE-DCG=2,2,2 - trichloroethyl 3-methyl-7-phenylacetamido-$\Delta^3$-cephem-4-carboxylate-1-oxide Reducing agents:

$Na_2S_2O_4$=sodium dithionite
$P\phi Cl_2$=phenylphosphonodichloridite
$\phi_3 P$=triphenylphosphine
$H(CH_3)_2 SiCl$=dimethylsilylchloride Activating agents:

$[CF_3 C(O)]_2$—O=2,2,2-trifluoroacetic anhydride
$P\phi Cl_2$=phenylphosphonodichloridite
$(C_2 H_5)_3 O^+ BF_4^-$=triethyloxonium tetrafluoroborate Results.—An estimate of the yield of sulfide from reduction of sulfoxide is made by comparing the relative size of the spot due to sulfoxide to that of sulfide in a thin layer chromatogram of the reaction product.

Good=substantially complete conversion to the cephalosporin sulfide with no detectable sulfoxide present
Poor=slight conversion to the cephalosporin sulfide, but reaction is either incomplete (as shown by presence of sulfoxide on chromatogram) or destruction of cephalosporin material
No rxn=no evidence of conversion to cephalosporin sulfide. Cephalosporin sulfoxide only is shown on chromatogram
Destruction=no evidence of cephalosporin suloxide starting material or cephalosporin sulfide on chromatogram In general, the reactants were combined in the proportion of about 100 mg. of cephalosporin sulfoxide, 100 mg. of reducing agent (about 2.8 milliequivalents relative to cephalosporin sulfoxide) and excess activating agent, if used.

| Sulfoxide | Reducing agent | Activating agent | Solvent | Temperature/time | Result |
| --- | --- | --- | --- | --- | --- |
| C E-DCV | $Na_2S_2O_4$ | $CH_3\overset{O}{\underset{\|\|}{C}}Cl$ | DMF | 0° C./½ hour | Good. |
| TCE-DCV | $Na_2S_2O_4$ | $C_6H_5\overset{O}{\underset{\|\|}{C}}Cl$ | DMF | 0° C./½ hour | Poor. |
| TCE-DCV | $Na_2S_2O_4$ | None | DMF | 25° C./½ hour | Very poor. |
| TCE-DCV | $Na_2S_2O_4$ | $(CH_3\overset{O}{\underset{\|\|}{C}})_2 O$ | DMF | 0° C./½ hour | No rxn. |
| TCE-DCV | $Na_2S_2O_4$ | $ClCH_2\overset{O}{\underset{\|\|}{C}}Cl$ | DMF | do | Good. |
| TCE-DCV | $Na_2S_2O_4$ | $(CH_3)_3 C\overset{O}{\underset{\|\|}{C}}Cl$ | DMF | do | Do. |
| TCE-DCV | $Na_2S_2O_4$ | $p\text{-}CH_3 O C_6 H_4 \overset{O}{\underset{\|\|}{C}}Cl$ | DMF | do | Poor. |
| TCE-DCV | $Na_2S_2O_4$ | $Cl\overset{O}{\underset{\|\|}{C}}\overset{O}{\underset{\|\|}{C}}Cl$ | $CH_3 CN$ | do | Good. |
| TCE-DCV | $Na_2S_2O_4$ | $CH_3\overset{O}{\underset{\|\|}{C}}Cl$ | $CH_3 CN$ | do | Do. |
| TCE-DCV | $Na_2S_2O_4$ | $SOCl_2$ | $CH_3 CN$ | do | Do. |
| TCE-DCV | $Na_2S_2O_4$ | $pCH_3 C_6 H_4 SO_2 Cl$ | $CH_3 CN$ | do | No rxn. |
| TCE-DCV | $Na_2S_2O_4$ | $3,5(NO_2)_2 C_6 H_3\overset{O}{\underset{\|\|}{C}}Cl$ | DMF | do | Do. |
| TCE-DCV | $Na_2S_2O_4$ | $CH_3 CH=CH\text{—}\overset{O}{\underset{\|\|}{C}}Cl$ | DMF | do | Poor. |
| TCE-DCV | $Na_2S_2O_4$ | $C_2 H_5 O \overset{O}{\underset{\|\|}{C}} Cl$ | DMF | do | No rxn. |
| TCE-DCV | $Na_2S_2O_4$ | $POCl_3$ | DMF | do | Good. |
| TCE-DCV | $Na_2S_2O_4$ | $PCl_3$ | DMF | do | Do. |
| TCE-DCV | $Na_2S_2O_4$ | $BF_3.O(C_2 H_5)_2$ | $CH_3 CN$ | do | No rxn. |
| TCE-DCV | $Na_2S_2O_4$ | $pCH_3 C_6 H_4 SO_3 H$ | DMF | 0° C./20 minutes | Do. |
| TCE-DCV | $Na_2S_2O_4$ | $PCl_5$ | DMF | 0° C./2 minutes | Good. |
| pMB-DCV | $Na_2S_2O_4$ | $CH_3\overset{O}{\underset{\|\|}{C}}Cl$ | DMF | 0° C./30 minutes | Do. |
| pMB-DCV | $Zn/HOAc\text{-}H_2 O$ | | $HOAc/H_2 O$ | 60° C./2 hours | Poor. |
| pMB-DCV | Zn | $Ac_2 O$ | $Ac_2 O$ | 70° C./1½ hours | No rxn. |

| Sulfoxide | Reducing agent | Activating agent | Solvent | Temperature/time | Result |
|---|---|---|---|---|---|
| TCE-DCV | $PCl_3$ | $PCl_3$ | DMF | 25° C./15 minutes | Good. |
| TCE-DCV | $Na_2S_2O_4$ | $C_6H_5\overset{O}{\overset{\|}{C}}Cl$ | DMF | 25° C./½ hour | Poor. |
| TCE-DCV | $Na_2S_2O_4$ | $Ac_2O/HClO_4$ | DMF | 0° C./1/2 hour | No rxn. |
| TCE-DCV | $Na_2S_2O_4$ | $pCH_3C_6H_4SOCl$ | DMF | 25° C./½ hour | Poor. |
| TCE-DCV | $Na_2S_2O_4$ | $pCH_3C_6H_4SOCl$ | DMF | 60° C./20 minutes | Do. |
| TCE-DCV | $P(OCH_3)_3$ | $CH_3\overset{O}{\overset{\|}{C}}Cl$ | DMF | 30° C./½ hour | Good. |
| TCE-DCV | $Na_2S_2O_4$ | $\phi\overset{O}{\overset{\|}{P}}Cl_2$ | DMF | 25° C./½ hour | Do. |
| TCE-DCV | $PCl_3$ | $PCl_3$ | $CH_2Cl_2$ | 25° C./4 hours | Do. |
| TCE-DCV | $PCl_3$ | $PCl_3$ | $CH_2Cl_2$ | 41° C./2 hours | Do. |
| TCE-DCV | $P(OCH_3)_3$ | None | $CH_2Cl_2$ | 41° C./7 hours | No rxn. |
| TCE-DCV | $\phi PCl_2$ | $P\phi Cl_2$ | $CH_2Cl_2$ | 25° C./3 days | Good. |
| TCE-DCV | $PBr_3$ | $PBr_3$ | $CH_2Cl_2$ | 25° C./2½ hours | Do. |
| TCE-DCV | None | $PCl_5$ | $CH_2Cl_2$ | 25° C./20 minutes | Destruction. |
| TCE-Ceph V | $PCl_3$ | $PCl_3$ | $CH_2Cl_2$ | 41° C./16 hours | Good. |
| TCE-DCV | $Na_2S_2O_4$ | $CH_3\overset{O}{\overset{\|}{C}}Cl$ | $CH_2Cl_2$ | 25° C./¼ hour | Do. |
| TCE-DCV | $Na_2S_2O_4$ | $(C_2H_5)_3\overset{\oplus}{O}BF_4^{\ominus}$ | $CH_2Cl_2$ | 0° C./16 hours | Very poor. |
| TCE-DCV | $Na_2S_2O_4$ | $C_6H_5\overset{O}{\overset{\|}{C}}Cl$ | $CH_2Cl_2$ | 41° C./18 hours | Poor. |
| TCE-DCV | $Na_2S_2O_4$ | $C_2H_5O\overset{O}{\overset{\|}{C}}Cl$ | THF | 60° C./1 hour | No rxn. |
| TCE-DCV | $Na_2S_2O_4$ | $(CH_3\overset{O}{\overset{\|}{C}})_2O$ | THF | 65° C./3 hours | Do. |
| TCE-DCV | $Na_2S_2O_4$ | $(CH_3\overset{O}{\overset{\|}{C}})_2O$ | $CH_2Cl_2$ | 25° C./75 minutes | Destruction. |
| TCE-DCV | $PCl_3$ | $PCl_3$ | Dioxane | 25° C./2 hours | Good. |
| TCE-DCV | $PCl_3$ | $PCl_3$ | THF | do | Do. |
| TCE-DCV | $PCl_3$ | $PCl_3$ | Acetone | do | Do. |
| TCE-DCV | $PCl_3$ | $PCl_3$ | $CH_3CN$ | do | Do. |
| TCE-DCV | $PCl_3$ | $PCl_3$ | $CH_2NO_2$ | do | Do. |
| TCE-DCV | $PCl_3$ | $PCl_3$ | $CHCl_3$ | do | Do. |
| TCE-DCV | $PCl_3$ | $PCl_3$ | $CCl_4$ | do | Do. |
| TCE-DCV | $PCl_3$ | $PCl_3$ | Benzene | 65° C./2 hours | Do. |
| TCE-DCV | $Na_2S_2O_4$ | $C_2H_5O\overset{O}{\overset{\|}{C}}Cl$ | $CH_2Cl_2$ | 41° C./24 hours | No rxn. |
| TCE-DCV | $Na_2S_2O_4$ | Same as above | $CH_3CN$ | 82° C./20 hours | Do. |
| TCE-DCV | $Na_2S_2O_4$ | do | $CH_3CH_2CH_2CN$ | 118° C./2 hours | Do. |
| TCE-DCV | $Na_2S_2O_4$ | do | $CH_3CH_2CH_2CN$ | 118° C./16 hours | Destruction. |
| TCE-DCV | $Na_2S_2O_4$ | $AlCl_3$ | $CH_3CN$ | 25° C./4 days | No rxn. |
| TCE-DCV | $Na_2S_2O_4$ | $SnCl_4$ | $CH_3CN$ | do | Do. |
| TCE-DCV | $Na_2S_2O_4$ | $HClO_4$ | $CH_3CN$ | 25° C./2 hours | Do. |
| TCE-DCV | $Na_2S_2O_4$ | $HClO_4$ | $CH_3CN$ | 25° C./30 hours | Destruction. |
| TCE-DCV | $Na_2S_2O_4$ | $ZnCl_2$ | $CH_3CN$ | 25° C./4 days | No rxn. |
| TCE-DCV | $Na_2S_2O_4$ | $pNO_2C_6H_4\overset{O}{\overset{\|}{C}}Cl$ | $CH_2Cl_2$ | 25° C./3 days | Very poor. |
| TCE-DCV | $Na_2S_2O_4$ | $3,5(NO_2)_2C_6H_3\overset{O}{\overset{\|}{C}}Cl$ | $CH_2Cl_2$ | do | Poor. |
| TCE-DCV | $Na_2S_2O_4$ | $pCH_3OC_6H_4\overset{O}{\overset{\|}{C}}Cl$ | $CH_2Cl_2$ | do | Do. |
| TCE-DCV | $Na_2S_2O_4$ | $pCH_3C_6H_4SO_2Cl$ | $CH_2Cl_2$ | do | No rxn. |
| TCE-DCV | $Na_2S_2O_2$ | $C_2H_5O\overset{O}{\overset{\|}{C}}Cl$/pyridine | $CH_2Cl_2$ | 41° C./7 hours | Very poor. |
| TCE-DCV | $\phi_3P$ | None | $CH_2Cl_2$ | 41° C./16 hours | No rxn. |
| TCE-DCV | $Na_2S_2O_4$ | $C_2H_5O\overset{O}{\overset{\|}{C}}Cl$/pyridine | $CHCl_3$ | 61° C./16 hours | Destruction. |
| TCE-DCV | $Na_2S_2O_4$ | $(CH_3\overset{O}{\overset{\|}{C}})_2O$/pyridine | $CH_2Cl_2$ | 25° C./3 days | No rxn. |
| TCE-DCV | $Na_2S_2O_4$ | 1,3 propane sultone | $CH_3CN$ | 25° C./½ hour | Good. |
| TCE-DCV | $Na_2S_2O_4$ | $pCNC_6H_4\overset{O}{\overset{\|}{C}}Cl$ | $CH_3CN$ | 25° C./16 hours | Do. |
| t Butyl-DCV | $PCl_3$ | $PCl_3$ | $CH_2Cl_2$ | 25° C./2 hours | Do. |
| TCE-DCV | $P(OCH_3)_3$ | None | Benzene | 85° C./24 hours | No rxn. |

| Sulfoxide | Reducing agent | Activating agent | Solvent | Temperature/time | Result |
|---|---|---|---|---|---|
| TCE-DCV | $Na_2S_2O_4$ | $(Cl_3C\overset{O}{\overset{\|}{C}})_2O$ | $CH_3CN$ | 25° C./3 days | Very poor. |
| TCE-DCV | $Na_2S_2O_4$ | $p-F_3C-C_6H_4\overset{O}{\overset{\|}{C}}Cl$ | $CH_3CN$ | 25° C./16 hours | Poor. |
| TCE-DCV | $Na_2S_2O_4$ | $(Cl_3C\overset{O}{\overset{\|}{C}})_2O$ | $CH_3CN$ | 25° C./3 hours | Destruction. |
| TCE-DCV | $H(CH_3)_2SiCl$ | $H(CH_3)_2SiCl$ | Benzene | 25° C./3 days | Good. |
| DCV | $Na_2S_2O_4$ | $CH_3\overset{O}{\overset{\|}{C}}Cl$ | DMF | 0° C./45 minutes | Do. |
| TCE-DCV | $HSiCl_3$ | $HSiCl_3$ | $CH_2Cl_2$ | 25° C./2 hours | Do. |
| TCE-DCG | $Na_2S_2O_4$ | $CH_3\overset{O}{\overset{\|}{C}}Cl$ | $CH_3CN$ | 0° C./45 minutes | Do. |
| TCE-DCG | $PCl_3$ | $PCl_3$ | $CH_2Cl_2$ | 41° C./2½ hours | Do. |
| TCE-DCV | $Na_2S_2O_4$ | $CH_3\overset{O}{\overset{\|}{C}}Cl$ | $CH_3CN$ | −20° C./40 minutes | Fair. |

Example 18 p-Methoxybenzyl 3-acetoxymethyl - 7 - phenoxyacetamido-$\Delta^3$-cephem-4-carboxylate-1-oxide, obtained by reacting p-methoxy-benzyl 3-bromomethyl-7-phenoxyacetomido-$\Delta^2$-cephem-4-carboxylate with sodium acetate in the manner described by Webber and Van Heyningen, indicated above, and then oxidizing that $\Delta^2$-cephalosporin ester to the above $\Delta^3$-cephalosporin sulfoxide ester with m-chloroperbenzoic acid, was reduced to the p-methoxybenzyl 3 - acetoxymethyl-7-phenoxyacetamido-$\Delta^3$-cephem-4-carboxylate by reacting the $\Delta^3$-cephalosporin sulfoxide ester with sodium dithionite in the presence of acetyl chloride at 0° C. to room temperature in a mixed diluent consisting of acetic acid/dimethylformamide.

In a similar manner p-methoxybenzyl 3-methoxymethyl-7-phenoxyacetamide - $\Delta^3$ - cephem-4-carboxylate-1-oxide was reduced to p-methoxybenzyl 3-methoxymethyl-7-phenoxyacetamido-$\Delta^3$-cephem-4-carboxylate with sodium dithionite in the presence of acetyl chloride at room temperature using dimethylformamide as an inert diluent.

p-Methoxybenzyl 3 - cyanomethyl - 7 - phenoxyacetamido-$\Delta^3$-cephem-4-carboxylate was obtained from the sulfoxide thereof by reaction of the 3-cyanomethyl cephalosporin sulfoxide ester with sodium dithionite in the presence of acetyl chloride at about 0° C. using dimethylformamide as diluent.

Similarly, tert-butyl 3-methoxymethyl-7-phenoxyacetamido-$\Delta^3$-cephem-4-carboxylate was obtained from the corresponding 3-methoxymethyl-$\Delta^3$-cephalosporin sulfoxide ester, obtained by the Webber-Van Heyningen method, by (a) reaction with phosphorus trichloride in methylene dichloride at about 42° C. (b) by reduction of the 3-methoxymethyl cephalosporin sulfoxide ester with stannous chloride in the presence of acetyl chloride at 0° to −25° C., and (c) by reduction of the 3-methoxymethyl-$\Delta^3$-cephalosporin sulfoxide ester with sodium dithionite in the presence of acetyl chloride at 0° C.

Example 19

Reduction of 2,2,2-trichloroethyl 3-methyl-7-phenoxyacetamido - $\Delta^3$ - cephem - 4 - carboxylate - 1 - oxide by catalytic hydrogenation:

Ethyl acetate (25 ml.) acetyl chloride (2 ml.) and 5 percent palladium-on-carbon (400 mg.) were placed in the reaction flask of an atmospheric pressure hydrogenation apparatus and equilibrated in a hydrogen atmosphere for about 15 minutes. 2,2,2-trichloroethyl 3-methyl-7-phenoxyacetamido-$\Delta^3$-cephem-4-carboxylate - 1 - oxide (200 mg., 0.402 mmole) was then added in ethyl acetate solution through the side arm of the reaction flask and reduction was allowed to proceed for 21 hours. At the end of this time, thin layer chromatographic analysis (silica gel $F_{254}$, benzene: ethyl acetate=1:1) of the filtered reaction mixture showed complete disappearance of starting material and appearance of a spot corresponding to the reduced product. The crude product (183 mg.) was purified by preparative thin layer chromatography and proven to be 2,2,2-trichloroethyl 3-methyl-7-phenoxyacetamido - $\Delta^3$ - cephem-4-carboxylate by comparing thin layer chromatogram (TLC), IR, UV, and NMR physical data with similar data from known samples of the same compound.

Similar experiments (using 50 mg. of sulfoxide) were carried out using 5 percent rhodium-on-carbon and $PtO_2$ with equally good results.

These and similar experiments using the same three catalysts and agents other than acetyl chloride are summarized below:

| Catalyst | Act. agent | Time, hrs. | Result (by T.L.C. anal.) |
|---|---|---|---|
| Pd/C | $CH_3-\overset{O}{\overset{\|}{C}}-Cl$ | 16 | Complete reduction. |
| Rh/C | Same as above | 4.5 | Do. |
| Pt | do | 8 | Do. |
| Rh/C | None | 17 | Very little reduction. |
| Rh/C | $(CH_3-\overset{O}{\overset{\|}{C}}-)_2O$ | 21 | Do. |
| Rh/C | $CH_3COOH$ | 48 | Do. |
| Pt | $CH_3CO_2H$ (solvent) | 12 | Do. |
| Pt | $(CH_3\overset{O}{\overset{\|}{C}}-)_2O$ | 2.7 | Do. |
| Pd/C | $CH_3SO_2Cl$ | 15 | Partial reduction, poor. |
| Pd/C | $C_6H_5\overset{O}{\overset{\|}{C}}-Cl$ | 2 | Partial reduction, good. |
| Pt | $POCl_3$ | 2 | Very little reduction. |
| Pt | $SOCl_2$ | 6 | Do. |
| Pt | $BF_3 \cdot O(C_2H_5)_2$ | 3 | Do. |

Example 20

2,2,2-trichloroethyl $\Delta^3$-methyl - 7[α - (phenoxy)acetamido]-3-cephem-4-carboxylate-1-oxide (800 mg., 0.16 mmole), dissolved in 50 ml. of methylene chloride, was stirred under nitrogen at room temperature while chloromethylene dimethyliminium chloride (825 mg., 6.5 mmoles) in 50 ml. of methylene chloride was added through a dropping funnel. The reaction solution was stirred for 2 hours and then poured into a separatory funnel containing 10 percent aqueous sodium acetate solution. After shaking vigorously, the organic layer was washed with water and dried over anhydrous magnesium sulfate. Removal of the solvent in vacuo yielded an oily material which was chromatographed over silica gel (eluent benzene) to yield a solid. Recrystallization from isopropyl alcohol gave 100 mg. of pure 2,2,2-trichloroethyl $\Delta^3$-methyl-7[$\alpha$-(phenoxy)acetamido]-$\Delta^3$-cephem-4-carboxylate, M.P. 108–110°, which had NMR, IR, and UV spectra identical to that of a known sample.

We claim:

1. A process which comprises treating (a) a $\Delta^3$-cephalosporin sulfoxide acid or ester with (b) a reducing agent selected from the group consisting of:
   (1) hydrogen in the presence of a hydrogenation catalyst
   (2) stannous, ferrous, cuprous, or manganous cations
   (3) dithionite, iodide, or ferrocyanide anions
   (4) trivalent phosphorus compounds having a molecular weight below about 500
   (5) halosilane compounds of the formula

wherein X is chlorine, bromine, or iodine, and each of $R^1$ and $R^2$ is hydrogen, chlorine, bromine, iodine, or a hydrocarbon radical free from aliphatic unsaturation and having from 1 to 8 carbon atoms, and
   (6) a chloromethylene iminium chloride of the formula

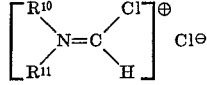

wherein each of $R^{10}$ and $R^{11}$ taken separately denote a $C_1$ to $C_3$ alkyl, or taken together with the nitrogen to which they are bonded complete a monocyclic heterocyclic ring having from 5 to 6 ring forming atoms and a total of from 4 to 8 carbon atoms, and an activating agent which is
   (c) an acid halide of an acid of carbon, sulfur, or phosphorus, which acid halide is inert to reduction by the reducing agent, and which acid halide has a second order hydrolysis constant equal to or greater than that of benzoyl chloride, or
   (d) a cyclic sultone of the formula

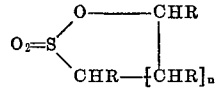

where $n$ is 0 or 1, and each R is defined separately as hydrogen, or $C_1$ to $C_3$ alkyl with not more than one such R being $C_1$ to $C_3$ alkyl, in a substantially anhydrous liquid medium at a temperature of from about —20° C. to about 100° C. to form a $\Delta^3$-cephalosporin acid or ester.

2. A process as defined in claim 12 wherein the cephalosporin sulfoxide (a) has the formula

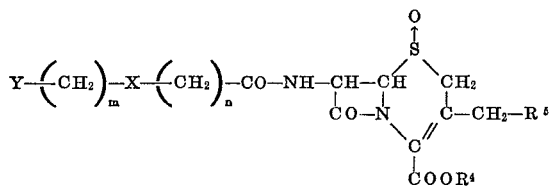

wherein
   $m$ is an integer of from 0 to 4, $n$ is an integer of from 1 to 4, X is oxygen or sulfur, or a chemical bond, and Y is thienyl, phenyl, or phenyl substituted with fluorine, chlorine, bromine, $C_1$ to $C_6$-alkyl, $C_1$ to $C_2$ alkoxy, nitro, cyano, N-protected alpha-amino-$C_1$ to $C_3$ alkyl, or trifluoromethyl;
   $R^4$ is hydrogen or $C_1$ to $C_6$ alkyl, $C_3$–$C_6$-alkenyl, $C_3$–$C_6$ alkynyl, chloroalkyl having from 2 to 6 carbon atoms, benzyl, methoxybenzyl, benzhydryl, bis(methoxyphenyl)methyl, phthalimidomethyl, succinimidomethyl, or phenacyl, and $R^5$ is hydrogen, $C_2$ to $C_6$-alkanoyloxy, $C_1$ to $C_6$ alkoxy, or cyano;

the reducing agent (b) is a compound containing dithionite, iodide, or ferrocyanide anions, and
the acid halide (c) is a $C_1$ to $C_{10}$ alkanoic acid halide.

3. A process as defined in claim 2 wherein (a) p-methoxybenzyl 3-methoxymethyl-7-phenoxyacetamido-$\Delta^3$-cephem-4-carboxylate-1-oxide is treated with (b) an alkali metal dithionite salt in the presence of (c) acetyl chloride to form p-methoxybenzyl 3-methoxymethyl-7-phenoxyacetamido-$\Delta^3$-cephem-4-carboxylate.

4. A process as defined in claim 2 wherein (2) 2,2,2-trichloroethyl 3-acetoxymethyl-7-phenoxyacetamido-$\Delta^3$-cephem-4-carboxylate-1-oxide is contacted with an alkali metal dithionite salt in the presence of acetyl chloride to form 2,2,2-trichloroethyl 3-acetoxymethyl-7-phenoxyacetamido-$\Delta^3$-cephem-4-carboxylate.

5. A process as defined in claim 12 wherein the cephalosporin sulfoxide (a) has the formula

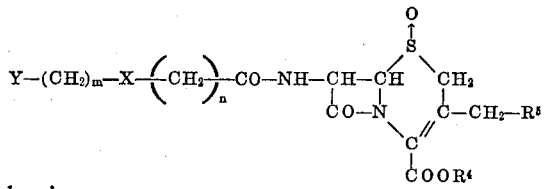

wherein
   $m$ is an integer of from 0 to 4, $n$ is an integer of from 1 to 4, X is oxygen or sulfur, or a chemical bond, and Y is thienyl, phenyl, or phenyl substituted with fluorine, chlorine, bromine, $C_1$ to $C_6$-alkyl, $C_1$ to $C_2$ alkoxy, nitro, cyano, N-protected alpha-amino-$C_1$ to $C_3$ alkyl, or trifluoromethyl;
   $R^4$ is $C_1$ to $C_6$ alkyl, $C_3$–$C_6$-alkenyl, $C_3$–$C_6$-alkynyl, chloroalkyl having from 2 to 6 carbons, benzyl, methoxybenzyl, benzhydryl, bis(methoxyphenyl)methyl, phthalimidomethyl, succinimidomethyl, or phenacyl, and $R^5$ is hydrogen, $C_2$ to $C_6$-alkanoyloxy, $C_1$ to $C_6$ alkoxy, or cyano;

the reducing agent (b) is a compound containing stannous, ferrous, cuprous, or manganous cations, and the acid halide (c) is a $C_1$ to $C_{10}$ alkanoic acid halide.

6. A process as defined in claim 5 wherein (a) 3-methyl-7-phenoxyacetamido-$\Delta^3$-cephem-4-carboxylic acid-1-oxide is treated with (b) stannous chloride, and (c) acetyl chloride to form 3-methyl-7-phenoxyacetamido-$\Delta^3$-cephem-4-carboxylic acid.

7. A process which comprises treating (a) a $\Delta^3$-cephalosporin sulfoxide acid or ester with
   (b) a reducing agent selected from the group consisting of
      (1) a trivalent phosphorus compound having at least one chlorine, bromine, or iodine bonded to the trivalent phosphorus atom, any remaining valences of the trivalent phosphorus atom being satisified by a -hydrocarbon, -O-hydrocarbon, or -S-hydrocarbon radical which is free of aliphatic unsaturation and has from 1 to 8 carbon atoms, or such -hydrocarbon, -O-hydrocarbon, and -S-hydrocarbon radicals substituted with chlorine or bromine;
      (2) a halosilane compound of the formula

wherein X is chlorine, bromine, or iodine, and each of $R^1$ and $R^2$ is hydrogen, chlorine, bromine, iodine, or a hydrocarbon radical free of aliphatic unsaturation having from 1 to 8 carbon atoms, and (3) chloromethylene iminium chlorides of the formula

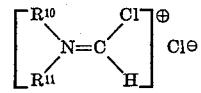

wherein each of $R^{10}$ and $R^{11}$ taken separately denotes a $C_1$ to $C_3$ alkyl, or taken together with the nitrogen to which they are bonded complete a monocyclic heterocyclic ring having from 5 to 6 ring forming atoms and a total of from 4 to 8 carbon atoms, in a substantially anhydrous liquid medium at a temperature of from about $-20°$ C. to about $100°$ C. to form a $\Delta^3$-cephalosporin acid or ester.

8. A process as defined in claim 13 wherein the $\Delta^3$-cephalosporin sulfoxide (a) has the formula $$Y-(CH_2)_m-X-(CH_2)_n-CO-NH-\underset{\underset{COOR^4}{|}}{\underset{|}{CH}}-\underset{|}{\overset{\overset{O}{\uparrow}}{\underset{|}{CH}}}\overset{S}{\diagdown}\overset{}{\underset{}{CH_2}}$$

wherein
  $m$ is an integer of from 0 to 4, $n$ is an integer of from 1 to 4, X is oxygen, sulfur, or a chemical bond, and Y is thienyl, phenyl, or phenyl substituted with fluorine, chlorine, bromine, $C_1$ to $C_6$ alkyl, $C_1$ to $C_2$ alkoxy, nitro, cyano, N-protected alphaamino-$C_1$ to $C_3$ alkyl, or trifluoromethyl;
  $R^4$ is hydrogen or $C_1$ to $C_6$ alkyl, $C_3$ to $C_6$ alkenyl, $C_3$–$C_6$ alkynyl, 2,2,2-trichloroethyl, 2,2,2-tribromoethyl, benzyl, methoxybenzyl, benzhydryl, bis(methoxyphenyl)methyl, phthalimidomethyl, succinimidomethyl, or phenacyl, and $R^5$ is hydrogen, $C_2$ to $C_6$-alkanoyloxy, $C_1$ to $C_6$ alkoxy, or cyano; and the reducing agent (b) is (1) a trivalent phosphorus compound having at least one chlorine, bromine, or iodine bonded to the trivalent phosphorus atom, any remaining valences of the trivalent phosphorous atom being satisfied by a -hydrocarbon, -O-hydrocarbon, or -S-hydrocarbon radical which is free of aliphatic unsaturation and has from 1 to 8 carbon atoms, and such -hydrocarbon, -O-hydrocarbon, or -S-hydrocarbon radicals substituted with chlorine or bromine.

9. A process as defined in claim 8 wherein 2,2,2- trichloroethyl 3-methyl-7-phenoxyacetamido - $\Delta^3$ - cephem-4-carboxylate-1-oxide is treated with phosphorus trichloride to form 2,2,2-trichloroethyl 3-methyl-7-phenoxyacetamido-$\Delta^3$-cephem-4-carboxylate.

10. A process as defined in claim 13 wherein the $\Delta^3$-cephalosporin sulfoxide (a) has the formula $$Y-(CH_2)_m-X-(CH_2)_n-CO-NH-\underset{\underset{COOR^4}{|}}{\underset{|}{CH}}-\underset{|}{\overset{\overset{O}{\uparrow}}{\underset{|}{CH}}}\overset{S}{\diagdown}\overset{}{\underset{}{CH_2}}$$

wherein
  $m$ is an integer of from 0 to 4, $n$ is an integer of from 1 to 4, X is oxygen, sulfur, or a chemical bond, and Y is thienyl, phenyl, or phenyl substituted with fluorine, chlorine, bromine, $C_1$ to $C_6$-alkyl, $C_1$ to $C_2$- alkoxy, nitro, cyano, N-protected alphaamino-$C_1$ to $C_3$ alkyl- or trifluoromethyl;
  $R^4$ is $C_1$ to $C_6$-alkyl, $C_3$–$C_6$-alkenyl, $C_3$–$C_6$-alkynyl, 2,2,2 - trichloroethyl, 2,2,2 - tribromoethyl, benzyl, methoxybenzyl, benzhydryl, bis(methoxyphenyl) methyl, phthalimidomethyl, succinimidomethyl, or phenacyl; and $R^5$ is hydrogen, $C_2$ to $C_6$ alkanoyloxy, $C_1$ to $C_6$-alkoxy, or cyano; and the reducing agent (b) is (2) a halosilane compound of the formula $$H-\underset{\underset{R^2}{|}}{\overset{\overset{R^1}{|}}{Si}}-X$$

wherein X is chlorine, bromine, or iodine, and each of $R^1$ and $R^2$ is hydrogen, chlorine, bromine, iodine, or a hydrocarbon radical free of aliphatic unsaturation having from 1 to 8 carbon atoms in a substantially anhydrous liquid medium at a temperature of from about $-20°$ C. to about $100°$ C.

11. A process as defined in claim 10 wherein 2,2,2-trichloroethyl 3 - methyl-7-phenoxyacetamido-$\Delta^3$-cephem-4-carboxylate-1-oxide is contacted with trichlorosilane to form 2,2,2-trichloroethyl 3-methyl-7-phenoxyacetamido-$\Delta^3$-cephem-4-carboxylate.

12. A process which comprises treating (a) a $\Delta^3$-cephalosporin sulfoxide acid or ester of the formula $$Y-(CH_2)_m-X-(CH_2)_n-CO-NH-\underset{\underset{COOR^4}{|}}{\underset{|}{CH}}-\underset{|}{\overset{\overset{O}{\uparrow}}{\underset{|}{CH}}}\overset{S}{\diagdown}\overset{}{\underset{}{CH_2}}$$

wherein
  $m$ is an integer of from 0 to 4, $n$ is an integer of from 1 to 4, X is oxygen or sulfur, or a chemical bond, and Y is thienyl, phenyl, or phenyl substituted with fluorine, chlorine, bromine, $C_1$ to $C_6$ alkyl, $C_1$ to $C_2$ alkoxy, nitro, cyano, N-protected alpha-amino-$C_1$ to $C_3$ alkyl, or trifluoromethyl;
  $R^4$ is hydrogen or $C_1$ to $C_6$ alkyl, $C_3$–$C_6$-alkenyl, $C_3$–$C_6$ alkynyl, chloralkyl having from 2 to 6 carbon atoms, benzyl, methoxybenzyl, benzhydryl, bis(methoxyphenyl)methyl, phthalimidomethyl, succinimidomethyl, or phenacyl, and $R^5$ is hydrogen, $C_2$ to $C_6$-alkanoyloxy, $C_1$ to $C_6$ alkoxy, or cyano;

with (b) a reducing agent selected from the group consisting of:
  (1) hydrogen in the presence of a hydrogenation catalyst,
  (2) stannous, ferrous, cuprous, or manganous cations,
  (3) dithionite, iodide, or ferrocyanide anions,
  (4) trivalent phosphorus compounds having a molecular weight below about 500.
  (5) halosilane compounds of the formula $$H-\underset{\underset{R^2}{|}}{\overset{\overset{R^1}{|}}{Si}}-X$$

wherein X is chlorine, bromine, or iodide, and each of $R^1$ and $R^2$ is hydrogen, chlorine, bromine, iodine, or a hydrocarbon radical free from aliphatic unsaturation and having from 1 to 8 carbon atoms, and
  (6) a chloromethylene iminium chloride of the formula $$\left[\underset{R^{11}}{\overset{R^{10}}{\diagdown}}N=C\overset{Cl}{\underset{H}{\diagup}}\right]^{\oplus}Cl^{\ominus}$$

wherein each of $R^{10}$ and $R^{11}$ taken separately denote a $C_1$ to $C_3$ alkyl, or taken together with the nitrogen to which they are bonded complete a monocyclic heterocyclic ring having from 5 to 6 ring-forming atoms and a total of from 4 to 8 carbon atoms, and activating agent which is
  (c) an acid halide of an acid of carbon, sulfur, or phosphorus, which acid halide is inert to reduction by the reducing agent, and which acid halide has a second order hydrolysis constant, equal to, or greater than that of benzoyl chloride, or
  (d) a cyclic sultone of the formula $$O_2=S\overset{O———CHR}{\underset{CHR—[CHR]_n}{\diagdown}}$$

where $n$ is 0 to 1, and each R is defined separately as hydrogen, or $C_1$ to $C_3$ alkyl with not more than one such R being $C_1$ to $C_3$ alkyl, in a substantially anhydrous liquid medium at a temperature of from about —20° C. to about 100° C. to form a $\Delta^3$-cephalosporin acid or ester.

13. A process which comprises treating (a) a $\Delta^3$-cephalosporin sulfoxide acid or ester of the formula

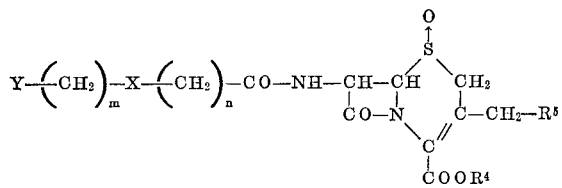

wherein
$m$ is an integer of from 0 to 4, $n$ is an integer of from 1 to 4, X is oxygen or sulfur, or a chemical bond, and Y is thienyl, phenyl, or phenyl substituted with fluorine, chlorine, bromine, $C_1$ to $C_6$ alkyl, $C_1$ to $C_2$ alkoxy, nitro, cyano, N-protected alpha-amino-$C_1$ to $C_3$ alkyl, or trifluoromethyl;

$R^4$ is hydrogen or $C_1$ to $C_6$ alkyl, $C_3$–$C_6$-alkenyl, $C_3$–$C_6$ alkynyl, chloroalkyl having from 2 to 6 carbon atoms, benzyl, methoxybenzyl, benzhydryl, bis-(ethoxyphenyl)methyl, phthalimidomethyl, succinimidomethyl, or phenacyl, or $R^5$ is hydrogen, $C_2$ to $C_6$-alkanoyloxy, $C_1$ to $C_6$ alkoxy, or cyano;

with (b) a reducing agent selected from the group consisting of
(1) a trivalent phosphorus compound having at least one chlorine, bromine, or iodine bonded to the trivalent phosphorus atom, any remaining valences of the trivalent phosphorus atom being satisfied by a -hydrocarbon, -O-hydrocarbon, or S-hydrocarbon radical which is free of aliphatic unsaturation and has from 1 to 8 carbon atoms, or such -hydrocarbon, -O-hydrocarbon, and -S-hydrocarbon radicals substituted with chlorine or bromine;

(2) a halosilane compound of the formula

wherein X is chlorine, bromine, or iodine, and each of $R^1$ and $R^2$ is hydrogen, chlorine, bromine, iodine, or a hydrocarbon radical free of aliphatic unsaturation having from 1 to 8 carbon atoms, and (3) chloromethylene iminium chlorides of the formula

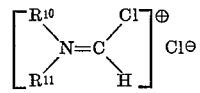

wherein each of $R^{10}$ and $R^{11}$ taken separately denotes a $C_1$ to $C_3$ alkyl, or taken together with the nitrogen to which they are bonded complete a monocyclic heterocyclic ring having from 5 to 6 ring-forming atoms and a total of from 4 to 8 carbon atoms, in a substantially anhydrous liquid medium at a temperature of from about —20° C. to about 100° C. to form a $\Delta^3$-cephalosporin acid or ester.

References Cited
UNITED STATES PATENTS
3,275,626  9/1966  Morin et al. _____ 260—243

NICHOLAS S. RIZZO, Primary Examiner

U.S. Cl. X.R.
260—239.1